(12) United States Patent
Cai et al.

(10) Patent No.: US 12,440,570 B2
(45) Date of Patent: Oct. 14, 2025

(54) CONJUGATION OF MCR1 LIGAND WITH CYTOTOXIC DRUGS FOR TREATING SKIN CANCER

(71) Applicant: ARIZONA BOARD OF REGENTS ON BEHALF OF THE UNIVERSITY OF ARIZONA, Tucson, AZ (US)

(72) Inventors: Minying Cai, Tucson, AZ (US); Victor J. Hruby, Tucson, AZ (US); Yang Zhou, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 853 days.

(21) Appl. No.: 17/579,237

(22) Filed: Jan. 19, 2022

(65) Prior Publication Data

US 2022/0143196 A1    May 12, 2022

Related U.S. Application Data

(63) Continuation-in-part of application No. PCT/US2020/042769, filed on Jul. 20, 2020.

(60) Provisional application No. 62/876,536, filed on Jul. 19, 2019.

(51) Int. Cl.
| | |
|---|---|
| *A61K 47/55* | (2017.01) |
| *A61K 9/00* | (2006.01) |
| *A61K 47/54* | (2017.01) |
| *A61K 47/64* | (2017.01) |
| *A61P 35/00* | (2006.01) |

(52) U.S. Cl.
CPC ............ *A61K 47/55* (2017.08); *A61K 9/0014* (2013.01); *A61K 47/545* (2017.08); *A61K 47/64* (2017.08); *A61P 35/00* (2018.01)

(58) Field of Classification Search
None
See application file for complete search history.

(56) References Cited

U.S. PATENT DOCUMENTS

| | | | | |
|---|---|---|---|---|
| 2014/0112873 A1* | 4/2014 | Gillies | ............... | C07K 7/08 424/9.1 |
| 2017/0014528 A1 | 1/2017 | Sengupta et al. | | |

FOREIGN PATENT DOCUMENTS

| | | |
|---|---|---|
| WO | 2012158960 A1 | 11/2012 |
| WO | 2016141151 A1 | 9/2016 |
| WO | 2021016182 A1 | 1/2021 |

OTHER PUBLICATIONS

Lin et al. "Camptothecin-Loaded Liposomes with alpha-Melanocyte-Stimulating Hormone Enhance Cytotoxicity Toward and Cellular Uptake by Melanomas: An Application of Nanomedicine on Natural Product." Journal of Traditional and Complementary Medicine. vol. 3, Issue 2, Apr.-Jun. 2013, pp. 102-109.

\* cited by examiner

*Primary Examiner* — Sergio Coffa
(74) *Attorney, Agent, or Firm* — NGUYEN TARBET IP LAW

(57) ABSTRACT

Ligand-drug conjugates for targeted melanoma therapies are disclosed herein. A ligand is conjugated to a cytotoxic cancer drug through a cleavage linker. The ligand can bind to an overexpressed receptor on a cancer cell, resulting in selectivity. This allows the drug to enter a cancer cell selectively and release the drug within that specific cancer cell. Such therapies provide selectivity to melanoma through a ligand that targets the MC1R receptor, which is highly expressed in 80% of malignant melanomas. The ligand-drug conjugates can be used to deliver a wide range of cytotoxic cancer drugs selective to melanoma cells which may solve the drug resistance problem of melanoma in current therapies.

16 Claims, 3 Drawing Sheets
Specification includes a Sequence Listing.

SHU9119

CPT-SHU9119

ID

SEQUENCE LISTING

```
<160> NUMBER OF SEQ ID NOS: 89

<210> SEQ ID NO 1
<211> LENGTH: 4
<212> TYPE: PRT
<213> ORGANISM: Artificial Sequence
<220> FEATURE:
<223> OTHER INFORMATION: modified hMCR peptide ligand

<400> SEQUENCE: 1

His Phe Arg Trp
1

<210> SEQ ID NO 2
<211> LENGTH: 4
<212> TYPE: PRT
<213> ORGANISM: Artificial Sequence
<220> FEATURE:
```

```
<223> OTHER INFORMATION: modified hMCR peptide ligand
<220> FEATURE:
<221> NAME/KEY: MISC_FEATURE
<222> LOCATION: (2)..(2)
<223> OTHER INFORMATION: D amino acid

<400> SEQUENCE: 2

His Phe Arg Trp
1

<210> SEQ ID NO 3
<211> LENGTH: 4
<212> TYPE: PRT
<213> ORGANISM: Artificial Sequence
<220> FEATURE:
<223> OTHER INFORMATION: modified hMCR peptide ligand
<220> FEATURE:
<221> NAME/KEY: MISC_FEATURE
<222> LOCATION: (2)..(2)
<223> OTHER INFORMATION: D-Nal(2')

<400> SEQUENCE: 3

His Xaa Arg Trp
1

<210> SEQ ID NO 4
<211> LENGTH: 7
<212> TYPE: PRT
<213> ORGANISM: Artificial Sequence
<220> FEATURE:
<223> OTHER INFORMATION: synthetic Melanotan-II peptide
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D amino acid
<220> FEATURE:
<221> NAME/KEY: MOD_RES
<222> LOCATION: (7)..(7)
<223> OTHER INFORMATION: AMIDATION

<400> SEQUENCE: 4

Leu Asp His Phe Arg Trp Lys
1               5

<210> SEQ ID NO 5
<211> LENGTH: 7
<212> TYPE: PRT
<213> ORGANISM: Artificial Sequence
<220> FEATURE:
<223> OTHER INFORMATION: synthetic SHU-9119 peptide
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
```

```
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MOD_RES
<222> LOCATION: (7)..(7)
<223> OTHER INFORMATION: AMIDATION

<400> SEQUENCE: 5

Leu Asp His Xaa Arg Trp Lys
1               5

<210> SEQ ID NO 6
<211> LENGTH: 12
<212> TYPE: PRT
<213> ORGANISM: Artificial Sequence
<220> FEATURE:
<223> OTHER INFORMATION: modifed derivative of gamma-melanocyte-
      stimulating hormone (gamma-MSH)
<220> FEATURE:
<221> NAME/KEY: MISC_FEATURE
<222> LOCATION: (3)..(3)
<223> OTHER INFORMATION: Met, Ile, Leu or Nle
<220> FEATURE:
<221> NAME/KEY: MISC_FEATURE
<222> LOCATION: (5)..(5)
<223> OTHER INFORMATION: His or Pro
<220> FEATURE:
<221> NAME/KEY: MISC_FEATURE
<222> LOCATION: (6)..(6)
<223> OTHER INFORMATION: Phe or DPhe
<220> FEATURE:
<221> NAME/KEY: MISC_FEATURE
<222> LOCATION: (7)..(7)
<223> OTHER INFORMATION: Arg or Leu
<220> FEATURE:
<221> NAME/KEY: MISC_FEATURE
<222> LOCATION: (8)..(8)
<223> OTHER INFORMATION: D-Nal(2'), Phe or Trp
<220> FEATURE:
<221> NAME/KEY: MISC_FEATURE
<222> LOCATION: (12)..(12)
<223> OTHER INFORMATION: optional C-terminal modification

<400> SEQUENCE: 6

Tyr Val Xaa Gly Xaa Xaa Xaa Xaa Asp Arg Phe Gly
1               5                   10

<210> SEQ ID NO 7
<211> LENGTH: 7
<212> TYPE: PRT
<213> ORGANISM: Artificial Sequence
<220> FEATURE:
<223> OTHER INFORMATION: modifed derivative of Melanotan-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (7)..(7)
```

```
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 7

Leu Asp His Phe Arg Trp Lys
1               5

<210> SEQ ID NO 8
<211> LENGTH: 7
<212> TYPE: PRT
<213> ORGANISM: Artificial Sequence
<220> FEATURE:
<223> OTHER INFORMATION: modifed derivative of Melanotan-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 8

Leu Asp His Phe Arg Trp Lys
1               5

<210> SEQ ID NO 9
<211> LENGTH: 7
<212> TYPE: PRT
<213> ORGANISM: Artificial Sequence
<220> FEATURE:
<223> OTHER INFORMATION: modifed derivative of Melanotan-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION
```

```
<400> SEQUENCE: 9

Leu Asp His Phe Arg Trp Lys
1               5

<210> SEQ ID NO 10
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 10

Leu Asp His Phe Arg Trp Lys
1               5

<210> SEQ ID NO 11
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MOD_RES
<222> LOCATION: (7)..(7)
<223> OTHER INFORMATION: AMIDATION

<400> SEQUENCE: 11

Leu Asp His Phe Arg Trp Lys
1               5
```

```
<210> SEQ ID NO 12
<211> LENGTH: 7
<212> TYPE: PRT
<213> ORGANISM: Artificial Sequence
<220> FEATURE:
<223> OTHER INFORMATION: modfed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 12

Leu Asp His Phe Arg Trp Lys
1               5

<210> SEQ ID NO 13
<211> LENGTH: 7
<212> TYPE: PRT
<213> ORGANISM: Artificial Sequence
<220> FEATURE:
<223> OTHER INFORMATION: modfed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 13
```

Leu Asp His Phe Arg Trp Lys
1               5

<210> SEQ ID NO 14
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 14

Leu Asp His Phe Arg Trp Lys
1               5

<210> SEQ ID NO 15
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)

```
<223> OTHER INFORMATION: AMIDATION

<400> SEQUENCE: 15

Leu Asp His Phe Arg Trp Lys
1               5

<210> SEQ ID NO 16
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 16

Leu Asp His Phe Arg Trp Lys
1               5

<210> SEQ ID NO 17
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
```

```
<220> FEATURE:
<221> NAME/KEY: MOD_RES
<222> LOCATION: (7)..(7)
<223> OTHER INFORMATION: AMIDATION

<400> SEQUENCE: 17

Leu Asp His Phe Arg Trp Lys
1               5

<210> SEQ ID NO 18
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 18

Leu Asp His Phe Arg Trp Lys
1               5

<210> SEQ ID NO 19
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
```

```
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 19

Leu Asp His Phe Arg Trp Lys
1               5

<210> SEQ ID NO 20
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 20

Leu Asp His Phe Arg Trp Lys
1               5

<210> SEQ ID NO 21
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
```

```
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 21

Leu Asp His Phe Arg Trp Lys
1               5

<210> SEQ ID NO 22
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 22

Leu Asp His Phe Arg Trp Lys
1               5

<210> SEQ ID NO 23
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
```

```
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 23

Leu Asp His Phe Arg Trp Lys
1               5

<210> SEQ ID NO 24
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 24

Leu Asp His Phe Arg Trp Lys
1               5

<210> SEQ ID NO 25
<211> LENGTH: 7
<212> TYPE: PRT
<213> ORGANISM: Artificial Sequence
<220> FEATURE:
<223> OTHER INFORMATION: modifed derivative of MELANOTAN-II
```

```
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 25

Leu Asp His Phe Arg Trp Lys
1               5

<210> SEQ ID NO 26
<211> LENGTH: 7
<212> TYPE: PRT
<213> ORGANISM: Artificial Sequence
<220> FEATURE:
<223> OTHER INFORMATION: modfed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 26
```

Leu Asp His Phe Arg Trp Lys
1               5

<210> SEQ ID NO 27
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 27

Leu Asp His Phe Arg Trp Lys
1               5

<210> SEQ ID NO 28
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)

```
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 28

Leu Asp His Phe Arg Trp Lys
1               5

<210> SEQ ID NO 29
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 29

Leu Asp His Phe Arg Trp Lys
1               5

<210> SEQ ID NO 30
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
```

```
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 30

Leu Asp His Phe Arg Trp Lys
1               5

<210> SEQ ID NO 31
<211> LENGTH: 7
<212> TYPE: PRT
<213> ORGANISM: Artificial Sequence
<220> FEATURE:
<223> OTHER INFORMATION: modfed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 31

Leu Asp His Phe Arg Trp Lys
1               5

<210> SEQ ID NO 32
<211> LENGTH: 7
<212> TYPE: PRT
<213> ORGANISM: Artificial Sequence
<220> FEATURE:
<223> OTHER INFORMATION: modfed derivative of MELANOTAN-II
<220> FEATURE:
```

```
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 32

Leu Asp His Phe Arg Trp Lys
1               5

<210> SEQ ID NO 33
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
```

```
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 33

Leu Asp His Phe Arg Trp Lys
1               5

<210> SEQ ID NO 34
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 34

Leu Asp His Phe Arg Trp Lys
1               5

<210> SEQ ID NO 35
<211> LENGTH: 7
<212> TYPE: PRT
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
```

```
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation

<400> SEQUENCE: 35

Leu Asp His Phe Arg Trp Lys
1               5

<210> SEQ ID NO 36
<211> LENGTH: 7
<212> TYPE: PRT
<213> ORGANISM: Artificial Sequence
<220> FEATURE:
<223> OTHER INFORMATION: modfed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 36

Leu Asp His Phe Arg Trp Lys
1               5

<210> SEQ ID NO 37
<211> LENGTH: 7
<212> TYPE: PRT
```

```
<213> ORGANISM: Artificial Sequence
<220> FEATURE:
<223> OTHER INFORMATION: modifed derivative of MELANOTAN-II
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D Amino Acid
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 37

Leu Asp His Phe Arg Trp Lys
1               5

<210> SEQ ID NO 38
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
```

```
<223> OTHER INFORMATION: AMIDATION

<400> SEQUENCE: 38

Leu Asp His Xaa Arg Trp Lys
1               5

<210> SEQ ID NO 39
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 39

Leu Asp His Xaa Arg Trp Lys
1               5

<210> SEQ ID NO 40
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 40

Leu Asp His Xaa Arg Trp Lys
```

<210> SEQ ID NO 41
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 41

Leu Asp His Xaa Arg Trp Lys
1               5

<210> SEQ ID NO 42
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MOD_RES
<222> LOCATION: (7)..(7)
<223> OTHER INFORMATION: AMIDATION

<400> SEQUENCE: 42

Leu Asp His Xaa Arg Trp Lys
1               5

<210> SEQ ID NO 43
<211> LENGTH: 7

```
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 43

Leu Asp His Xaa Arg Trp Lys
1               5

<210> SEQ ID NO 44
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 44

Leu Asp His Xaa Arg Trp Lys
1               5
```

```
<210> SEQ ID NO 45
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 45

Leu Asp His Xaa Arg Trp Lys
1               5

<210> SEQ ID NO 46
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 46
```

Leu Asp His Xaa Arg Trp Lys
1               5

<210> SEQ ID NO 47
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 47

Leu Asp His Xaa Arg Trp Lys
1               5

<210> SEQ ID NO 48
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 48

Leu Asp His Xaa Arg Trp Lys
1               5

<210> SEQ ID NO 49
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 49

Leu Asp His Xaa Arg Trp Lys
1               5

<210> SEQ ID NO 50
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:

```
<221> NAME/KEY: MOD_RES
<222> LOCATION: (7)..(7)
<223> OTHER INFORMATION: AMIDATION

<400> SEQUENCE: 50

Leu Asp His Xaa Arg Trp Lys
1               5

<210> SEQ ID NO 51
<211> LENGTH: 7
<212> TYPE: PRT
<213> ORGANISM: Artificial Sequence
<220> FEATURE:
<223> OTHER INFORMATION: modfed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 51

Leu Asp His Xaa Arg Trp Lys
1               5

<210> SEQ ID NO 52
<211> LENGTH: 7
<212> TYPE: PRT
<213> ORGANISM: Artificial Sequence
<220> FEATURE:
<223> OTHER INFORMATION: modfed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
```

```
<222> LOCATION: (4)..(4)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 52

Leu Asp His Xaa Arg Trp Lys
1               5

<210> SEQ ID NO 53
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 53

Leu Asp His Xaa Arg Trp Lys
1               5

<210> SEQ ID NO 54
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
```

```
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 54

Leu Asp His Xaa Arg Trp Lys
1               5

<210> SEQ ID NO 55
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 55

Leu Asp His Xaa Arg Trp Lys
1               5

<210> SEQ ID NO 56
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
```

```
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 56

Leu Asp His Xaa Arg Trp Lys
1               5

<210> SEQ ID NO 57
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 57

Leu Asp His Xaa Arg Trp Lys
1               5
```

```
<210> SEQ ID NO 58
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 58

Leu Asp His Xaa Arg Trp Lys
1               5

<210> SEQ ID NO 59
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
```

```
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 59

Leu Asp His Xaa Arg Trp Lys
1               5

<210> SEQ ID NO 60
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 60

Leu Asp His Xaa Arg Trp Lys
1               5

<210> SEQ ID NO 61
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
```

```
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 61

Leu Asp His Xaa Arg Trp Lys
1               5

<210> SEQ ID NO 62
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 62

Leu Asp His Xaa Arg Trp Lys
1               5

<210> SEQ ID NO 63
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
```

```
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 63

Leu Asp His Xaa Arg Trp Lys
1               5

<210> SEQ ID NO 64
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
```

<223> OTHER INFORMATION: AMIDATION

<400> SEQUENCE: 64

Leu Asp His Xaa Arg Trp Lys
1               5

<210> SEQ ID NO 65
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 65

Leu Asp His Xaa Arg Trp Lys
1               5

<210> SEQ ID NO 66
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation

```
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 66

Leu Asp His Xaa Arg Trp Lys
1               5

<210> SEQ ID NO 67
<211> LENGTH: 7
<212> TYPE: PRT
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 67

Leu Asp His Xaa Arg Trp Lys
1               5

<210> SEQ ID NO 68
<211> LENGTH: 7
<212> TYPE: PRT
```

```
<213> ORGANISM: Artificial Sequence
<220> FEATURE:
<223> OTHER INFORMATION: modifed derivative of SHU9119
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (3)..(3)
<223> OTHER INFORMATION: N-methylation
<220> FEATURE:
<221> NAME/KEY: MISC_FEATURE
<222> LOCATION: (4)..(4)
<223> OTHER INFORMATION: D-Nal(2')
<220> FEATURE:
<221> NAME/KEY: MISC_FEATURE
<222> LOCATION: (4)..(4)
<223> OTHER INFORMATION: N-methylation
<220> FEATURE:
<221> NAME/KEY: MISC_FEATURE
<222> LOCATION: (5)..(5)
<223> OTHER INFORMATION: N-methylation
<220> FEATURE:
<221> NAME/KEY: MISC_FEATURE
<222> LOCATION: (6)..(6)
<223> OTHER INFORMATION: N-methylation
<220> FEATURE:
<221> NAME/KEY: MISC_FEATURE
<222> LOCATION: (7)..(7)
<223> OTHER INFORMATION: N-methylation
<220> FEATURE:
<221> NAME/KEY: MOD_RES
<222> LOCATION: (7)..(7)
<223> OTHER INFORMATION: AMIDATION

<400> SEQUENCE: 68

Leu Asp His Xaa Arg Trp Lys
1               5

<210> SEQ ID NO 69
<211> LENGTH: 6
<212> TYPE: PRT
<213> ORGANISM: Artificial sequence
<220> FEATURE:
<223> OTHER INFORMATION: modified MC1R peptide ligand
<220> FEATURE:
<221> NAME/KEY: MISC_FEATURE
<222> LOCATION: (1)..(1)
<223> OTHER INFORMATION: 4-phenylbutyryl
<220> FEATURE:
<221> NAME/KEY: MISC_FEATURE
<222> LOCATION: (2)..(2)
<223> OTHER INFORMATION: D amino acid
<220> FEATURE:
<221> NAME/KEY: MISC_FEATURE
<222> LOCATION: (6)..(6)
<223> OTHER INFORMATION: hex-5-ynoyl
<220> FEATURE:
<221> NAME/KEY: MOD_RES
<222> LOCATION: (6)..(6)
<223> OTHER INFORMATION: AMIDATION

<400> SEQUENCE: 69

His Phe Arg Trp Gly Lys
1               5
```

```
<210> SEQ ID NO 70
<211> LENGTH: 13
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (1)..(1)
<223> OTHER INFORMATION: hex-5-ynoyl
<220> FEATURE:
<221> NAME/KEY: MISC_FEATURE
<222> LOCATION: (4)..(4)
<223> OTHER INFORMATION: Norleucine
<220> FEATURE:
<221> NAME/KEY: MISC_FEATURE
<222> LOCATION: (7)..(7)
<223> OTHER INFORMATION: DNal(2')
<220> FEATURE:
<221> NAME/KEY: MISC_FEATURE
<222> LOCATION: (9)..(9)
<223> OTHER INFORMATION: D amino acid
<220> FEATURE:
<221> NAME/KEY: MOD_RES
<222> LOCATION: (13)..(13)
<223> OTHER INFORMATION: AMIDATION

<400> SEQUENCE: 70

Lys Tyr Val Leu Gly His Xaa Arg Trp Asp Arg Phe Gly
1               5                   10

<210> SEQ ID NO 71
<211> LENGTH: 13
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (1)..(1)
<223> OTHER INFORMATION: hex-5-ynoyl
<220> FEATURE:
<221> NAME/KEY: MISC_FEATURE
<222> LOCATION: (4)..(4)
<223> OTHER INFORMATION: Norleucine
<220> FEATURE:
<221> NAME/KEY: MISC_FEATURE
<222> LOCATION: (7)..(7)
<223> OTHER INFORMATION: DNal(2')
<220> FEATURE:
<221> NAME/KEY: MISC_FEATURE
<222> LOCATION: (9)..(9)
<223> OTHER INFORMATION: D amino acid
<220> FEATURE:
<221> NAME/KEY: MOD_RES
<222> LOCATION: (13)..(13)
<223> OTHER INFORMATION: AMIDATION

<400> SEQUENCE: 71

Lys Tyr Val Leu Gly His Xaa Arg Phe Asp Arg Phe Gly
1               5                   10

<210> SEQ ID NO 72
<211> LENGTH: 4
<212> TYPE: PRT
<213> ORGANISM: Artificial sequence
<220> FEATURE:
<223> OTHER INFORMATION: modified MC1R peptide ligand
<220> FEATURE:
<221> NAME/KEY: MISC_FEATURE
<222> LOCATION: (1)..(1)
<223> OTHER INFORMATION: 4-phenylbutyryl
<220> FEATURE:
<221> NAME/KEY: MISC_FEATURE
<222> LOCATION: (2)..(2)
```

```
<223> OTHER INFORMATION: D amino acid
<220> FEATURE:
<221> NAME/KEY: MOD_RES
<222> LOCATION: (4)..(4)
<223> OTHER INFORMATION: AMIDATION

<400> SEQUENCE: 72

His Phe Arg Trp
1

<210> SEQ ID NO 73
<211> LENGTH: 4
<212> TYPE: PRT
<213> ORGANISM: Artificial sequence
<220> FEATURE:
<223> OTHER INFORMATION: modified MC1R peptide ligand
<220> FEATURE:
<221> NAME/KEY: MISC_FEATURE
<222> LOCATION: (1)..(1)
<223> OTHER INFORMATION: Ac-Homophenylalanine
<220> FEATURE:
<221> NAME/KEY: MISC_FEATURE
<222> LOCATION: (2)..(2)
<223> OTHER INFORMATION: D amino acid
<220> FEATURE:
<221> NAME/KEY: MOD_RES
<222> LOCATION: (4)..(4)
<223> OTHER INFORMATION: AMIDATION

<400> SEQUENCE: 73

His Phe Arg Trp
1

<210> SEQ ID NO 74
<211> LENGTH: 4
<212> TYPE: PRT
<213> ORGANISM: Artificial sequence
<220> FEATURE:
<223> OTHER INFORMATION: modified MC1R peptide ligand
<220> FEATURE:
<221> NAME/KEY: MISC_FEATURE
<222> LOCATION: (1)..(1)
<223> OTHER INFORMATION: 4-hydroxycinnamoyl
<220> FEATURE:
<221> NAME/KEY: MISC_FEATURE
<222> LOCATION: (2)..(2)
<223> OTHER INFORMATION: D amino acid
<220> FEATURE:
<221> NAME/KEY: MOD_RES
<222> LOCATION: (4)..(4)
<223> OTHER INFORMATION: AMIDATION

<400> SEQUENCE: 74

His Phe Arg Trp
1

<210> SEQ ID NO 75
<211> LENGTH: 12
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (3)..(3)
<223> OTHER INFORMATION: Norleucine
<220> FEATURE:
<221> NAME/KEY: MISC_FEATURE
<222> LOCATION: (6)..(6)
<223> OTHER INFORMATION: DNal(2')
<220> FEATURE:
<221> NAME/KEY: MISC_FEATURE
<222> LOCATION: (8)..(8)
```

```
<223> OTHER INFORMATION: D amino acid
<220> FEATURE:
<221> NAME/KEY: MOD_RES
<222> LOCATION: (12)..(12)
<223> OTHER INFORMATION: AMIDATION

<400> SEQUENCE: 75

Tyr Val Leu Gly His Xaa Arg Trp Asp Arg Phe Gly
1               5                   10

<210> SEQ ID NO 76
<211> LENGTH: 12
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (3)..(3)
<223> OTHER INFORMATION: Norleucine
<220> FEATURE:
<221> NAME/KEY: MISC_FEATURE
<222> LOCATION: (6)..(6)
<223> OTHER INFORMATION: DNal(2')
<220> FEATURE:
<221> NAME/KEY: MISC_FEATURE
<222> LOCATION: (8)..(8)
<223> OTHER INFORMATION: D amino acid
<220> FEATURE:
<221> NAME/KEY: MOD_RES
<222> LOCATION: (12)..(12)
<223> OTHER INFORMATION: AMIDATION

<400> SEQUENCE: 76

Tyr Val Leu Gly His Xaa Arg Phe Asp Arg Phe Gly
1               5                   10

<210> SEQ ID NO 77
<211> LENGTH: 12
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (3)..(3)
<223> OTHER INFORMATION: Norleucine
<220> FEATURE:
<221> NAME/KEY: MISC_FEATURE
<222> LOCATION: (6)..(6)
<223> OTHER INFORMATION: D amino acid
<220> FEATURE:
<221> NAME/KEY: MISC_FEATURE
<222> LOCATION: (8)..(8)
<223> OTHER INFORMATION: DNal(2')
<220> FEATURE:
<221> NAME/KEY: MOD_RES
<222> LOCATION: (12)..(12)
<223> OTHER INFORMATION: AMIDATION

<400> SEQUENCE: 77

Tyr Val Leu Gly His Phe Arg Xaa Asp Arg Phe Gly
1               5                   10

<210> SEQ ID NO 78
<211> LENGTH: 12
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (6)..(6)
```

```
<223> OTHER INFORMATION: D amino acid
<220> FEATURE:
<221> NAME/KEY: MISC_FEATURE
<222> LOCATION: (8)..(8)
<223> OTHER INFORMATION: DNal(2')
<220> FEATURE:
<221> NAME/KEY: MOD_RES
<222> LOCATION: (12)..(12)
<223> OTHER INFORMATION: AMIDATION

<400> SEQUENCE: 78

Tyr Val Leu Gly His Phe Arg Xaa Asp Arg Phe Gly
1               5                   10

<210> SEQ ID NO 79
<211> LENGTH: 12
<212> TYPE: PRT
<213> ORGANISM: Artificial Sequence
<220> FEATURE:
<223> OTHER INFORMATION: modified peptide ligand
<220> FEATURE:
<221> NAME/KEY: MISC_FEATURE
<222> LOCATION: (6)..(6)
<223> OTHER INFORMATION: D amino acid
<220> FEATURE:
<221> NAME/KEY: MISC_FEATURE
<222> LOCATION: (8)..(8)
<223> OTHER INFORMATION: DNal(2')
<220> FEATURE:
<221> NAME/KEY: MOD_RES
<222> LOCATION: (12)..(12)
<223> OTHER INFORMATION: AMIDATION

<400> SEQUENCE: 79

Tyr Val Ile Gly His Phe Arg Xaa Asp Arg Phe Gly
1               5                   10

<210> SEQ ID NO 80
<211> LENGTH: 12
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 80

Tyr Val Leu Gly Pro Phe Arg Trp Asp Arg Phe Gly
1               5                   10

<210> SEQ ID NO 81
<211> LENGTH: 12
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 81

Tyr Val Leu Gly Pro Phe Arg Phe Asp Arg Phe Gly
1               5                   10

<210> SEQ ID NO 82
<211> LENGTH: 12
<212> TYPE: PRT
<213> ORGANISM: Artificial Sequence
```

```
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 82

Tyr Val Leu Gly His Phe Leu Trp Asp Arg Phe Gly
1               5                   10

<210> SEQ ID NO 83
<211> LENGTH: 12
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 83

Tyr Val Leu Gly His Phe Leu Phe Asp Arg Phe Gly
1               5                   10

<210> SEQ ID NO 84
<211> LENGTH: 12
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 84

Tyr Val Leu Gly Pro Phe Leu Trp Asp Arg Phe Gly
1               5                   10

<210> SEQ ID NO 85
<211> LENGTH: 12
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 85

Tyr Val Leu Gly Pro Phe Leu Phe Asp Arg Phe Gly
1               5                   10

<210> SEQ ID NO 86
<211> LENGTH: 12
<212> TYPE: PRT
<213> ORGANISM: Artificial Sequence
<220> FEATURE:
<223> OTHER INFORMATION: modifed derivative of gamma-MSH

<400> SEQUENCE: 86

Tyr Val Leu Gly His Phe Arg Trp Asp Arg Phe Gly
1               5                   10

<210> SEQ ID NO 87
<211> LENGTH: 12
```

```
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 87

Tyr Val Leu Gly His Phe Arg Trp Asp Arg Phe Gly
1               5                   10

<210> SEQ ID NO 88
<211> LENGTH: 12
<212> TYPE: PRT
<213> ORGANISM: Artificial Sequence
<220> FEATURE:
<223> OTHER INFORMATION: modifed derivative of gamma-MSH
<220> FEATURE:
<221> NAME/KEY: MOD_RES
<222> LOCATION: (12)..(12)
<223> OTHER INFORMATION: AMIDATION

<400> SEQUENCE: 88

Tyr Val Met Gly Pro Phe Arg Trp Asp Arg Phe Gly
1               5                   10

<210> SEQ ID NO 89
<211> LENGTH: 7
<212> TYPE: PRT
<213> ORGANISM: Artificial Sequence
<220> FEATURE:
<223> OTHER INFORMATION: synthetic cyclic peptide
<220> FEATURE:
<221> NAME/KEY: MOD_RES
<222> LOCATION: (1)..(1)
<223> OTHER INFORMATION: ACETYLATION
<220> FEATURE:
<221> NAME/KEY: MISC_FEATURE
<222> LOCATION: (1)..(1)
<223> OTHER INFORMATION: Norleucine
<220> FEATURE:
<221> NAME/KEY: MISC_FEATURE
<222> LOCATION: (2)..(7)
<223> OTHER INFORMATION: cyclic
<220> FEATURE:
<221> NAME/KEY: MISC_FEATURE
<222> LOCATION: (4)..(4)
<223> OTHER INFORMATION: DPhe or D-Nal(2')
<220> FEATURE:
<221> NAME/KEY: MOD_RES
<222> LOCATION: (7)..(7)
<223> OTHER INFORMATION: AMIDATION

<400> SEQUENCE: 89

Leu Asp His Xaa Arg Trp Lys
1               5
```

CONJUGATION OF MCR1 LIGAND WITH CYTOTOXIC DRUGS FOR TREATING SKIN CANCER

CROSS-REFERENCES TO RELATED APPLICATIONS

This application is a continuation-in-part and claims benefit of PCT Application No. PCT/US2020/042769 filed Jul. 20, 2020, which claims benefit of U.S. Patent Application No. 62/876,536, filed Jul. 19, 2019, the specification(s) of which is/are incorporated herein in their entirety by reference.

STATEMENT REGARDING FEDERALLY SPONSORED RESEARCH OR DEVELOPMENT

This invention was made with government support under Grant No. RO1 GM108040 awarded by National Institutes of Health. The government has certain rights in the invention.

REFERENCE TO A SEQUENCE LISTING

Applicant asserts that the paper copy of the Sequence Listing is identical to the Sequence Listing in computer readable form found on the accompanying computer file, entitled UNIA 19_11_PCT_CIP_Sequence_List_ST25. The content of the sequence listing is incorporated herein by reference in its entirety.

FIELD OF THE INVENTION

The present invention relates to ligand-drug conjugates as targeted cancer therapies. In one embodiment, the ligand-drug conjugates may be used for treating melanoma.

BACKGROUND OF THE INVENTION

Melanoma is the most deadly form of skin cancer in the United States, with an estimated 87,110 new cases and 9,730 deaths in 2017. Once metastasized, the median overall survival for malignant melanoma patients is 5.3 months. Despite recent breakthroughs for developing BRAF-V600E and programmed cell death protein 1 (PD-1) inhibitors, current treatments can only improve survival, and tumor cells eventually become resistant to these treatments. The BRAF-V600E inhibitor vemurafenib was shown to prolong the median overall survival of patients with BRAF V600E mutant melanoma to 15.9 months. However, a mice study showed that 20% of melanoma tumors became resistant to vemurafenib treatment after 56 days. Similarly, 60% to 70% of metastatic melanoma patients are innately resistant to PD-1 inhibitor treatments. To increase response rate and avoid the resistance issue, there is a need for melanoma drugs that can target biological processes that are fundamental for cell proliferation or survival, so that the therapeutic effect cannot be easily bypassed through activation of a compensating signal pathway. Nevertheless, current anticancer agents that target cell proliferation or survival usually have poor selectivity to cancer cells and thus are also toxic to healthy non-cancer cells. Hence, there is a need for a treatment that can effectively combat drug resistance issues and extenuate side effects.

The melanocortin 1 receptor (MC1R) is a G protein-coupled receptor that is mainly expressed on melanocytes to regulate skin pigmentation. Upon sun exposure, the endogenous agonist a-melanocyte-stimulating hormone (α-MSH) is produced, which activates MC1R on melanocytes to induce melanin production and skin pigmentation. MC1R is found to be highly expressed in 80% of malignant melanomas, and thus has been demonstrated as a selective target for melanoma imaging. Even with non-selective peptide ligands that can also bind to other melanocortin receptor subtypes, the in vivo imaging studies demonstrated high melanoma uptake and low normal organ uptake except for the kidney.

The present invention features novel ligand-targeted chemo-therapeutic agents targeting MC1R overexpressing melanoma. Based on the biological data provided herein, a drug-MT-II conjugate can bind to MC1R, and mediate selective drug delivery to melanoma cells through its interactions with MC1R. Using camptothecin as a non-limiting example of a cytotoxic drug, it was further confirmed that CPT-MT-II can effectively kill melanoma cells in low nanomolar range in vitro. Taken together, the drug-MT-II conjugate motif is a promising approach to selectively deliver cytotoxic drugs that target pathways essential for cell proliferation or survival to MC1R overexpressing melanoma.

BRIEF SUMMARY OF THE INVENTION

It is an objective of the present invention to provide ligand-targeted therapies that target MC1R-overexpressing melanoma in order to utilize cytotoxic drugs that may be less likely to result in melanoma treatment resistance but would otherwise lack selectivity to melanoma cells, as specified in the independent claims. Embodiments of the invention are given in the dependent claims. Embodiments of the present invention can be freely combined with each other if they are not mutually exclusive.

The present invention describes a technique to deliver drugs specifically to cancer cells with reduced off-target effects. In some aspects, the present invention comprises a ligand that can bind to an overexpressed receptor on a cancer cell, resulting in improved selectivity for drug delivery. The ligand may be conjugated to a cancer drug through a cleavage linker. This allows the drug to enter a cancer cell selectively and release the drug within that specific cancer cell. By exploiting cells that express specific receptors that bind to a specific molecule and designing drugs to respond to a receptor, specific targeting of cells by a drug is achieved.

In some embodiments, the present invention may be used to deliver a wide range of cytotoxic drugs for treating melanoma. In other embodiments, the present invention describes ligand-drug conjugates for targeted melanoma therapies. A ligand-drug conjugate may comprise a ligand, a spacer, a cleavable linker, and a drug moiety. The ligand can bind to a melanocortin 1 receptor (MC1R), which is highly expressed in 80% of malignant melanomas. Without wishing to be limited to particular theory or mechanism, once bound to the receptor, the conjugate drug moiety is internalized by the melanoma cell through endocytosis where the acidic environment causes the conjugate molecule to dissociate with the receptor. The cleavage linker is then degraded by the lysosome, which releases the drug moiety into the cancer cell.

Without wishing to limit the invention to any theory or mechanism, it is believed that the present invention can advantageously increase a survival rate of those affected with melanoma by providing a targeted melanoma therapy that can increase efficacy of cancer treatment and circumvent drug resistance in tumor cells associated with current therapies. The present invention further avoids indiscriminate cytotoxic drug release, resulting in fewer side effects and less damage to healthy non-cancer cells, other organs, and tissues.

In some embodiments, the present invention features a pharmaceutical composition comprising a ligand-drug conjugate comprising a peptide ligand bound to a drug moiety. In some embodiments, the ligand-drug conjugate is according to the formula: L-A-B-D, where L is the peptide ligand, A is a spacer, B is a cleavable linker, and D is the drug moiety. In some embodiments, the peptide ligand is selective for a melanocortin 1 receptor (MC1R).

In a non-limiting embodiment, the peptide ligand may be according to the formula: Ac-Nle-c[Asp-His-Taa-Arg-Trp-Lys]-NH$_2$ (SEQ ID NO: 89), where Taa is DPhe or DNal(2'), or is a derivative that has at least 50% homology to SEQ ID NO: 89. In another embodiment, the derivative may have at least 60% homology, at least 70% homology, at least 80% homology, or at least 90% homology to SEQ ID NO: 89. In some embodiments, the peptide ligand may have at least one backbone residue that is N-methylated.

In some embodiments, the peptide ligand may be of the following: Ac-Nle-c[Asp-His-DPhe-Arg-Trp-Lys]-NH$_2$ (SEQ ID NO: 4) or Ac-Nle-c[Asp-His-DNal(2')-Arg-Trp-Lys]-NH$_2$ (SEQ ID NO: 5), or a derivative that has at least 50% homology to SEQ ID NO: 4 or SEQ ID NO: 5. In other embodiments, the peptide ligand may be according to the formula: H-Tyr$^1$-Val$^2$-Waa$^3$-Gly$^4$-Xaa$^5$-Paa$^6$-Yaa$^7$-Zaa$^8$-Asp$^9$-Arg$^{10}$-Phe$^{11}$-Gly$^{12}$-R1 (SEQ ID NO:6), where Waa is a Met, Ile, Leu, or Nle, Xaa is a His or Pro, Paa is Phe or DPhe, Yaa is an Arg or Leu, and Zaa is a Dnal(2'), Phe or Trp, with the caveat that Waa is not Met, Xaa is not His, Yaa is not Arg, and Zaa is not Trp simultaneously. In some other embodiments, the peptide ligand may be a derivative that has at least 50% homology to SEQ ID NO: 6. In other embodiments, the derivative may have at least 60% homology, at least 70% homology, at least 80% homology, or at least 90% homology to SEQ ID NO: 4, SEQ ID NO: 5, or SEQ ID NO: 6.

Examples of the peptide ligand include, but are not limited to, any sequence of SEQ ID NO. 7-68 or 77-88, which are described in TABLE 1 of the detailed description. In some embodiments, the ligand-drug conjugate is according to the following:

In some embodiments, the spacer is derived from aminohexanoic acid and cysteine. In other embodiments, the cleavable linker is a biodegradable linker. In some embodiments, the cleavable linker may comprise 1,2,3-triazole, an imine, a disulfide, a thioether, a primary amide, or a secondary amide.

In some aspects, the drug moiety is a cancer drug. In some aspects, the drug moiety is a topoisomerase I inhibitor. In other embodiments, the drug moiety is camptothecin. In some embodiments, the drug moiety is a BRAF, MEK, PD-1, PD-L1, or CTLA-4 inhibitor. Non-limiting examples of the drug moiety include Atezolizumab, Avelumab, Aldesleukin, Binimetinib, Braftovi, Carboplatin, Cemiplimab-rwlc, Cisplatin, Cobimetinib, Dabrafenib Mesylate, Dacarbazine, Diclofenac, Durvalumab, Encorafenib, 5-Fluorouracil, hyaluronic acid, Imiquimod, Imlygic, Ingenol mebutate, Interleukin-2, Ipilimumab, Nivolumab, Paclitaxel, Peginterferon Alfa-2b, Pembrolizumab, Recombinant Interferon Alfa-2b, Sonidegib, Talimogene Laherparepvec, Temozolomide, Trametinib, Vemurafenib, Vinblastine, Vismodegib, or combinations thereof.

In some embodiments, the ligand-drug conjugate may be effective for killing a melanoma cell. In some embodiments, the ligand-drug conjugate binds to a MC1 receptor of the melanoma cell via the peptide ligand. In some embodiments, the drug moiety targets pathways essential for cell proliferation or survival.

According to other embodiments, the present invention also features a method of treating skin cancer in a subject in need of such treatment. The method may comprise administering to the subject a therapeutically effective amount of a pharmaceutical composition according to those described herein. In some embodiments, the pharmaceutical composition is administered at a dose ranging from about 0.001 mg/kg to 100 mg/kg of body weight.

According to some other embodiments, the present invention also features a method of increasing selectivity of a drug for a target receptor. In one embodiment, the method may comprise attaching a spacer to a peptide ligand that is selective for MC1R, attaching a cleavable linker to a drug moiety, and attaching the cleavable linker to the spacer, thereby linking the peptide ligand to the drug moiety to form a ligand-drug conjugate that is that is selective for MC1R.

As a non-limiting example, the method may produce the following ligand-drug conjugate that can increase the selectivity of the drug for a target receptor:

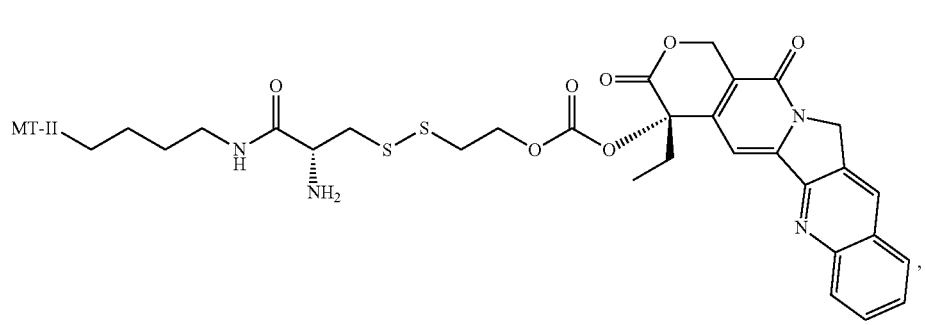

where MT-II is Melanotan-II (SEQ ID NO: 4).

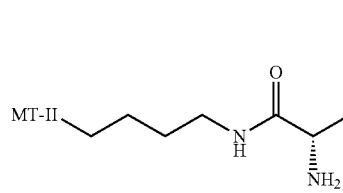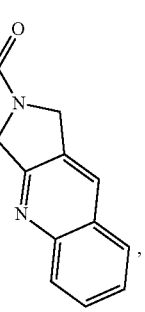

where MT-II is Melanotan-II (SEQ ID NO: 4).

In some embodiments, the peptide ligand may be according to any one of the peptide ligands described herein. In some embodiments, the spacer may be derived from aminohexanoic acid and cysteine. In other embodiments, the cleavable linker may be any one of the biodegradable linkers described herein. In some other embodiments, the drug moiety may be any one of the drugs described herein.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1:
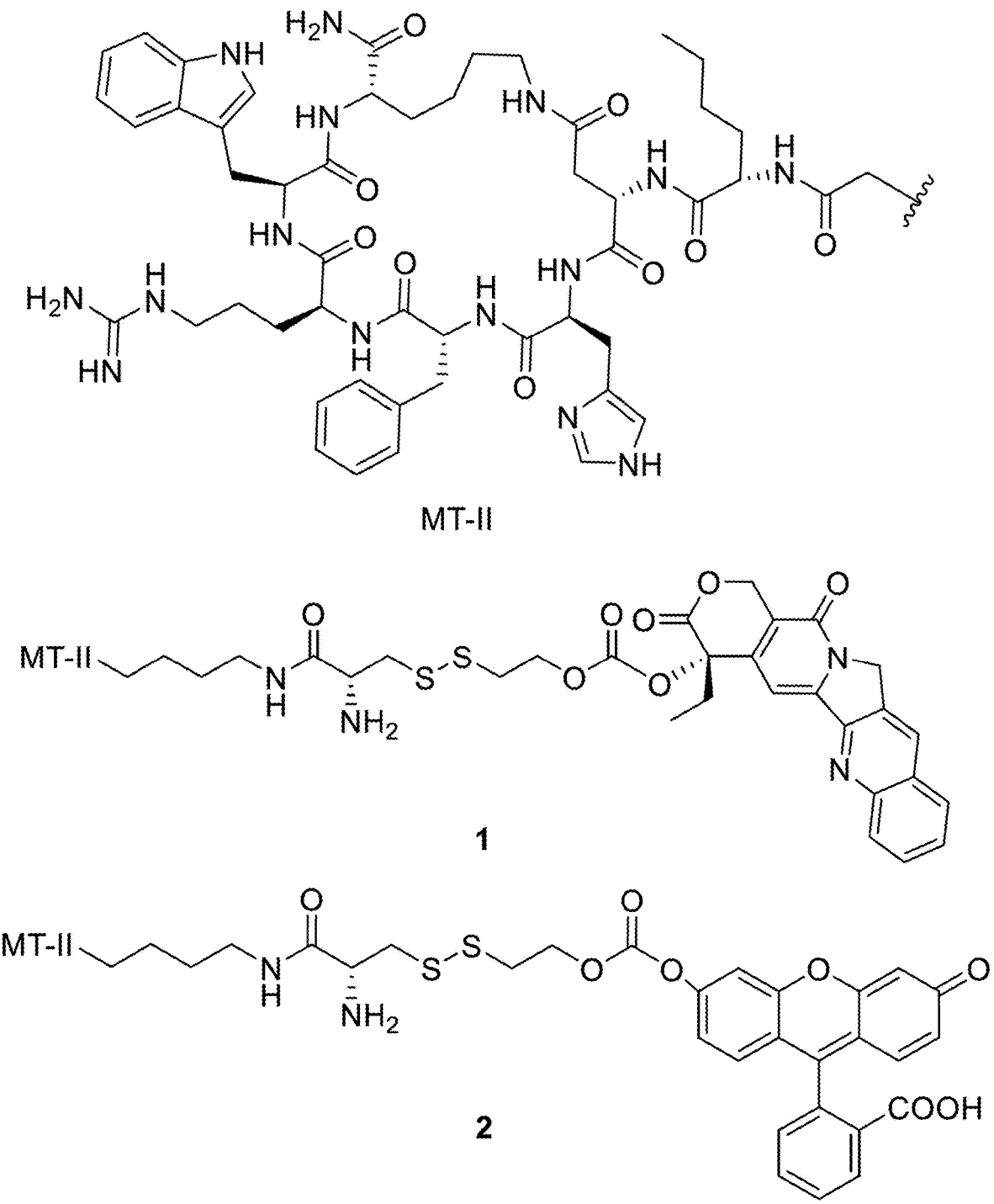
FIG. 1 shows structures of melanotan-II (MT-II), camptothecin (CPT)-MT-II conjugate (1), and fluorescein-MT-II conjugate (2).

The specifications of U.S. Pat. Nos. 10,329,326, 9,441,013, 9,290,539, 10,188,704, U.S. application Ser. No. 16/450,382, and U.S. application Ser. No. 16/281,725 are incorporated herein in their entirety by reference.

The twenty amino acids that are found in nature, i.e. occur naturally, are as follows: alanine, arginine, glycine, asparagine, aspartic acid, cysteine, glutamine, glutamic acid, serine, threonine, histidine, lysine, methionine, proline, valine, isoleucine, leucine, tyrosine, tryptophan, and phenylalanine. This application adheres to the IUPAC rules of standard abbreviations for amino acids.

Each amino acid may be either natural or unnatural of the "D" or "L" configuration which corresponds to the stereochemical designation "S" and "R," respectively, as known to one of ordinary skill in the art. Only L-amino acids are manufactured in cells and incorporated into proteins. It is understood that in the following detailed description and appended claims, the abbreviations and nomenclature employed are those which are standard in amino acid and peptide chemistry, and that all amino acids are referred to in L-form unless otherwise specified. The letter "D" preceding any three-letter abbreviation for an amino acid denotes the D-form of the amino acid, and a lack thereof refers to the L-form.

As used herein, the term "peptide," is defined as an amino acid sequence from three amino acids to about 700 amino acids in length. As used herein, the term " ligand" refers to a compound with affinity for melanocortin receptors, particularly melanocortin 1 receptors (MC1R) (e.g. MC1R ligand), that can result in measurable biological activity in cells, tissues, or organisms that contain the MC receptor.

As used herein, the terms "treat", "treating", or "treatment" refer to both therapeutic treatment and prophylactic or preventative measures, with the objective of preventing, reducing, slowing down (lessen), inhibiting, or eliminating an undesired physiological change, symptom, disease, or disorder, such as the development or spread of skin cancers such as melanoma or carcinoma. For purposes of this invention, beneficial or desired clinical results include, but are not limited to, alleviation of symptoms, diminishment of extent of disease, stabilized (i.e., not worsening) state of disease, delay or slowing of disease progression, amelioration or palliation of the disease state, and remission (whether partial or total), whether detectable or undetectable. "Treatment" can also mean prolonging survival as compared to expected survival if not receiving treatment. Those in need of treatment include those already with the condition or disorder as well as those prone to have the condition or disorder or those in which the condition or disorder is to be prevented or onset delayed. Optionally, the subject or patient may be identified (e.g., diagnosed) as one suffering from the disease or condition (e.g., skin cancer) prior to administration of the pharmaceutical composition of the present invention. Subjects at risk for skin cancer can be identified by, for example, any or a combination of appropriate diagnostic or prognostic assays known in the art.

A "therapeutically effective amount" refers to an amount that is sufficient to achieve the desired therapeutic result or to have an ameliorating effect on undesired symptoms, but is generally insufficient to cause adverse side effects. The specific therapeutically effective dose level for any particular patient will depend upon a variety of factors including the disease being treated and the severity of the disease; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products.

In some embodiments, the therapeutically effective amount is sufficient to inhibit growth or proliferation of a target cell, such as a tumor cell, either in vitro or in vivo, irrespective of the mechanism by which cell growth is inhibited (e.g., by cytostatic properties, cytotoxic properties, etc.). In a preferred embodiment, proliferation or growth of the target cell in vivo or in cell culture is inhibited (i.e., slows to some extent and preferably stops) by greater than about 20%, preferably greater than about 50%, most preferably greater than about 75% (e.g., from about 75% to about 100%).

A "subject" is an individual and includes, but is not limited to, a mammal (e.g., a human, horse, pig, rabbit, dog, sheep, goat, non-human primate, cow, cat, guinea pig, or rodent), a fish, a bird, a reptile or an amphibian. The term does not denote a particular age or sex. Thus, adult and newborn subjects, as well as fetuses, whether male or female, are intended to be included. A "patient" is a subject afflicted with a disease or disorder, such as melanoma or carcinoma. The term "patient" includes human and veterinary subjects. In some embodiments, the subject may be a mammal. For example, the mammal is a human.

The terms "administer" and "administering" refer to methods of providing or introducing a pharmaceutical composition to a subject. Such methods are known to those skilled in the art and include, but are not limited to, administering the compositions orally, parenterally (e.g., intravenously and subcutaneously, not orally), by intramuscular injection, by intraperitoneal injection, intrathecally, transdermally, extracorporeally, topically or the like.

Ligand-Drug Conjugates

Recent breakthroughs of BRAF-V600E inhibitors and PD-1 inhibitors have successfully prolonged the median overall survival for malignant melanoma patients. Nevertheless, tumor cells eventually relapse and become resistant to these treatments. To completely cure melanoma would require cytotoxic drugs that target biological processes essential for cell proliferation or survival, so that melanoma cells cannot easily bypass the therapeutic target to survive treatment, or that they are quickly eliminated before they can accumulate enough mutations to become resistant. However, the cytotoxic drugs normally have poor selectivity to cancer cells and thus possess high risks of side effects.

Referring to the figures, the present invention features the first ligand-drug conjugate targeting melanoma, which can selectively deliver cytotoxic drugs to melanoma cells through the overexpressed receptor MC1R. In one embodiment, the present invention features a pharmaceutical composition comprising a ligand-drug conjugate. The ligand-drug conjugate may comprise a peptide ligand bound to a drug moiety. Without wishing to limit the present invention, the pharmaceutical composition may be effective for treating skin cancer. Moreover, the ligand-drug conjugate can have high selectivity to MC1R and have low risks of side effects. For example, the pharmaceutical composition may be used in treating melanoma. In one embodiment, the ligand-drug conjugate may be effective for killing a melanoma cell. The ligand-drug conjugate can bind to an MC1R of the melanoma cell via the peptide ligand, and the drug moiety targets pathways essential for cell proliferation or survival.

In another embodiment, the present invention features a method of treating skin cancer in a subject in need of such treatment. The method may comprise administering to the subject a therapeutically effective amount of any one of the pharmaceutical compositions described herein. In other embodiments, the method may further comprise combining the administration of the pharmaceutical composition with another therapy. Examples of such therapies include, but are not limited to, immunotherapy, radiation therapy, surgery, or co-administration with another drug or different ligand-drug conjugate.

In some embodiments, the subject is a mammal. For example, the mammal may be human or non-human. In some embodiments, the pharmaceutical composition is administered orally, percutaneously, or parenterally. The pharmaceutical composition may be administered at a dose ranging from about 0.001 mg/kg to 100 mg/kg of body weight. In other embodiments, the pharmaceutical composition may be administered at one or more times daily or one or more times weekly. Preferably, the ligand-drug conjugate can deliver the drug moiety into a melanoma cell in about 60-180 minutes.

According to another embodiment, the present invention features a method of producing a ligand-drug conjugate. The method may comprise linking a peptide ligand to a drug moiety thereby forming the ligand-drug conjugate. In a preferred embodiment, the peptide ligand may be selective for MC1R.

In yet another embodiment, the present invention features a method of increasing selectivity of a drug for a target receptor. The method may comprise attaching a spacer to a peptide ligand that is selective for the target receptor, attaching a cleavable linker to the drug, and attaching the cleavable linker to the spacer, thereby linking the peptide ligand to the drug to form a ligand-drug conjugate that is that is selective for the target receptor. In preferred embodiments, the peptide ligand may be selective for M1R.

In conjunction with any of the aforementioned embodiments, the ligand-drug conjugate may be according to the formula: L-A-B-D, where L is the peptide ligand, A is the spacer, B is the cleavable linker, and D is the drug moiety.

In some embodiments, the MC1R peptide ligand is a derivative of α-MSH or λ-MSH. In one embodiment, the MC1R peptide ligand may comprise the amino acid motif His-Phe-Arg-Trp (SEQ ID NO: 1), His-DPhe-Arg-Trp (SEQ ID NO: 2), or His-DNal(2')-Arg-Trp (SEQ ID NO: 3), or a derivative thereof with at least 50% homology or at least 75% homology to the amino acid motif. In another embodiment, the MC1R peptide ligand is Melanotan-II (MT-II): Ac-Nle-c[Asp-His-DPhe-Arg-Trp-Lys]-NH$_2$ (SEQ ID NO: 4), or SHU-9119: Ac-Nle-c[Asp-His-DNal(2')-Arg-Trp-Lys]-NH$_2$ (SEQ ID NO: 5). In other embodiments, the MC1R peptide ligand may be a derivative of MT-II or SHU-9119 with at least 50% homology, at least 60% homology, at least 70% homology, at least 80% homology, or at least 90% homology.

In yet other embodiments, the MC1R peptide ligand may be according to the formula: H-Tyr$^1$-Val$^2$-Waa$^3$-Gly$^4$-Xaa$^5$-Paa$^6$-Yaa$^7$-Zaa$^8$-Asp$^9$-Arg$^{10}$-Phe$^{11}$-Gly$^{12}$-R1 (SEQ ID NO: 6). In some embodiments, Waa is a Met, Ile, Leu, or Nle, Xaa is a His or Pro Paa is Phe or DPhe, Yaa is an Arg or Leu, and Zaa is a Dnal(2'), Phe or Trp, with the caveat that Waa is not Met, Xaa is not His, Yaa is not Arg, and Zaa is not Trp simultaneously. In some embodiments, R1 of the C-terminal is —NH$_2$, or —OH.

In some other embodiments, the peptide ligand may be according to the formula: Ac-Nle-c[Asp-His-Taa-Arg-Trp-Lys]-NH$_2$ (SEQ ID NO: 89), where Taa is DPhe or DNal(2'), or is a derivative that has at least 50% homology to SEQ ID NO: 89. In other embodiments, the derivative may have at least 60% homology, at least 70% homology, at least 80% homology, or at least 90% homology to SEQ ID NO: 89. In some embodiments, the peptide ligand may have at least one backbone residue that is N-methylated.

In some embodiments, the MC1R peptide ligand may be according to any one of the peptides in TABLE 1 below.

TABLE 1

Non-limiting examples of the M01R peptide ligand.

SEQ ID NO: 7  Ac-Nle-c[Asp-His-DPhe-Arg-Trp-(NMe)Lys]-NH$_2$

SEQ ID NO: 8  Ac-Nle-c[Asp-His-DPhe-Arg-(NMe)Trp-Lys]-NH$_2$

SEQ ID NO: 9  Ac-Nle-c[Asp-His-DPhe-(NMe)Arg-Trp-Lys]-NH$_2$

SEQ ID NO: 10 Ac-Nle-c[Asp-His-(NMe)DPhe-Arg-Trp-Lys]-NH$_2$

SEQ ID NO: 11 Ac-Nle-c[Asp-(NMe)His-DPhe-Arg-Trp-Lys]-NH$_2$

SEQ ID NO: 12 Ac-Nle-c[Asp-His-DPhe-Arg-(NMe)Trp-(NMe)Lys]-NH$_2$

SEQ ID NO: 13 Ac-Nle-c[Asp-Hs-DPhe-(NMe)Arg-Trp-(NMe)Lys]-NH$_2$

SEQ ID NO: 14 Ac-Nle-c[Asp-His-(NMe)DPhe-Arg-Trp-(NMe)Lys]-NH$_2$

SEQ ID NO: 15 Ac-Nle-c[Asp-(NMe)His-DPhe-Arg-Trp-(NMe)Lys]-NH$_2$

SEQ ID NO: 16 Ac-Nle-c[Asp-His-DPhe-(NMe)Arg-(NMe)Trp-Lys]-NH$_2$

SEQ ID NO: 17 Ac-Nle-c[Asp-His-(NMe)DPhe-Arg-(NMe)Trp-Lys]-NH$_2$

SEQ ID NO: 18 Ac-Nle-c[Asp-(NMe)His-DPhe-Arg-(NMe)Trp-Lys]-NH$_2$

SEQ ID NO: 19 Ac-Nle-c[Asp-His-(NMe)DPhe-(NMe)Arg-Trp-Lys]-NH$_2$

SEQ ID NO: 20 Ac-Nle-c[Asp-(NMe)His-DPhe-(NA4e)Arg-Trp-Lys]-NH$_2$

SEQ ID NO: 21 Ac-Nle-c[Asp-(NMe)His-(NMe)DPhe-Arg-Trp-Lys]-NH$_2$

SEQ ID NO: 22 Ac-Nle-c[Asp-His-DPhe-(NMe)Arg-(NMe)Trp-(NMe)Lys]-NH$_2$

SEQ ID NO: 23 Ac-Nle-c[Asp-Hs-(NMe)DPhe-Arg-(NMe)Trp-(NMe)Lys]-NH$_2$

SEQ ID NO: 24 Ac-Nle-c[Asp-(NMe)His-DPhe-Arg-(NMe)Trp-(NMe)Lys]-NH$_2$

SEQ ID NO: 25 Ac-Nle-c[Asp-His-(NMe)DPhe-(NMe)Arg-Trp-(NMe)Lys]-NH$_2$

SEQ ID NO: 26 Ac-Nle-c[Asp-(NAne)His-DPhe-(NMe)Arg-Trp-(NMe)Lys]-NH$_2$

SEQ ID NO: 27 Ac-Nle-c[Asp-(NMe)His-(NMe)DPhe-Arg-Trp-(NMe)Lys]-NH$_2$

SEQ ID NO: 28 Ac-Nle-c[Asp-His-(NMe)DPhe-(NMe)Arg-(NMe)Trp-Lys]-NH$_2$

SEQ ID NO: 29 Ac-Nle-c[Asp-(NMe)His-DPhe-(NMe)Arg-(NMe)Trp-Lys]-NH$_2$

SEQ ID NO: 30 Ac-Nle-c[Asp-(NMe)His-(NMe)DPhe-Arg-(NMe)Trp-Lys]-NH$_2$

SEQ ID NO: 31 Ac-Nle-c[Asp-(NMe)His-(NMe)DPhe-(NMe)Arg-Trp-Lys]-NH$_2$

SEQ ID NO: 32 Ac-Nle-c[Asp-His-(NMe)DPhe-(NMe)Arg-(NMe)Trp-(NMe)Lys]-NH$_2$

SEQ ID NO: 33 Ac-Nle-c[Asp-(NMe)His-DPhe-(NMe)Arg-(NMe)Trp-(NMe)Lys]-NH$_2$

SEQ ID NO: 34 Ac-Nle-c[Asp-(NMe)His-(NMe)DPhe-Arg-(NMe)Trp-(NMe)Lys]-NH$_2$

SEQ ID NO: 35 Ac-Nle-c[Asp-(NMe)His-(NMe)DPhe-(NMe)Arg-Trp-(NMe)Lys]-NH$_2$

SEQ ID NO: 36 Ac-Nle-c[Asp-(NMe)His-(NMe)DPhe-(NMe)Arg-(NMe)Trp-Lys]-NH$_2$

TABLE 1-continued

Non-limiting examples of the MOIR peptide ligand.

SEQ ID NO: 37 Ac-Nle-c[Asp-(NMe)His-(NMe)DPhe-(NMe)Arg-(NMe)Trp-(NMe)Lys]-NH$_2$

SEQ ID NO: 38 Ac-Nle-c[Asp-His-DNal(2')-Arg-Trp-(NMe)Lys]-NH$_2$

SEQ ID NO: 39 Ac-Nle-c[Asp-His-DNal(2')-Arg-(NMe)Trp-Lys]-NH$_2$

SEQ ID NO: 40 Ac-Nle-c[Asp-His-DNal(2')-(NMe)Arg-Trp-Lys]-NH$_2$

SEQ ID NO: 41 Ac-Nle-c[Asp-His-(NMe)DNal(2')-Arg-Trp-Lys]-NH$_2$

SEQ ID NO: 42 Ac-Nle-c[Asp-(NMe)His-DNal(2')-Arg-Trp-Lys]-NH$_2$

SEQ ID NO: 43 Ac-Nle-c[Asp-His-DNal(2')-Arg-(NMe)Trp-(NMe)Lys]-NH$_2$

SEQ ID NO: 44 Ac-Nle-c[Asp-His-DNal(2)-(NMe)Arg-Trp-(NMe)Lys]-NH$_2$

SEQ ID NO: 45 Ac-Nle-c[Asp-His-(NMe)DNal(2')-Arg-(NMe)Lys]-NH$_2$

SEQ ID NO: 46 Ac-Nle-c[Asp-(NMe)His-DNal(2')-Arg-Trp-(NMe)Lys]-NH$_2$

SEQ ID NO: 47 Ac-Nle-c[Asp-His-DNal(2')-(NMe)Arg-(NMe)Trp-Lys]-NH$_2$

SEQ ID NO: 48 Ac-Nle-c[Asp-His-(NMe)DNal(2')-Arg-(NMe)Trp-Lys]-NH$_2$

SEQ ID NO: 49 Ac-Nle-c[Asp-(NMe)His-DNal(2)-Arg-(NMe)Trp-Lys]-NH$_2$

SEQ ID NO: 50 Ac-Nle-c[Asp-His-(NMe)DNal(2)-(NMe)Arg-Trp-Lys]-NH$_2$

SEQ ID NO: 51 Ac-Nle-c[Asp-(NMe)His-DNal(2')-(NMe)Arg-Trp-Lys]-NH$_2$

SEQ ID NO: 52 Ac-Nle-c[Asp-(NMe)His-(NMe)DNal(2')-Arg-Trp-Lys]-NH$_2$

SEQ ID NO: 53 Ac-Nle-c[Asp-His-DNal(2')-(NMe)Arg-(NMe)Trp-(NMe)Lys]-NH$_2$

SEQ ID NO: 54 Ac-Nle-c[Asp-His-(NMe)DNal(2')-Arg-(NMe)Trp-(NMe)Lys]-NH$_2$

SEQ ID NO: 55 Ac-Nle-c[Asp-(NMe)His-DNal(2')-Arg-(NMe)Trp-(NMe)Lys]-NH$_2$

SEQ ID NO: 56 Ac-Nle-c[Asp-His-(NMe)DNal(2)-(NMe)Arg-Trp-(NMe)Lys]-NH$_2$

SEQ ID NO: 57 Ac-Nle-c[Asp-(NMe)His-DNal(2')-(NMe)Arg-Trp-(NMe)Lys]-NH$_2$

SEQ ID NO: 58 Ac-Nle-c[Asp-(NMe)His-(NMe)DNal(2')-Arg-Trp-(NMe)Lys]-NH$_2$

SEQ ID NO: 59 Ac-Nle-c[Asp-His-(NMe)DNal(2)-(NMe)Arg-(NMe)Trp-Lys]-NH$_2$

SEQ ID NO: 60 Ac-Nle-c[Asp-(NMe)His-DNal(2')-(NMe)Arg-(NMe)Trp-Lys]-NH$_2$

SEQ ID NO: 61 Ac-Nle-c[Asp-(NMe)His-(NMe)DNal(2')-Arg-(NMe)Trp-Lys]-NH$_2$

SEQ ID NO: 62 Ac-Nle-c[Asp-(NMe)His-(NMe)DNal(2')-(NMe)Arg-Trp-Lys]-NH$_2$

SEQ ID NO: 63 Ac-Nle-c[Asp-His-(NMe)DNal(2)-(NMe)Arg-(NMe)Trp-(NMe)Lys]-NH$_2$

SEQ ID NO: 64 Ac-Nle-c[Asp-(NMe)His-DNal(2')-(NMe)Arg-(NMe)Trp-(NMe)Lys]-NH$_2$

SEQ ID NO: 65 Ac-Nle-c[Asp-(NMe)His-(NMe)DNal(2')-Arg-(NMe)Trp-(NMe)Lys]-NH$_2$

SEQ ID NO: 66 Ac-Nle-c[Asp-(NMe)His-(NMe)DNal(2')-(NMe)Arg-Trp-(NMe)Lys]-NH$_2$

SEQ ID NO: 67 Ac-Nle-c[Asp-(NMe)His-(NMe)DNal(2)-(NMe)Arg-(NMe)Trp-Lys]-NH$_2$

SEQ ID NO: 68 Ac-Nle-c[Asp-(NMe)His-(NMe)DNal(2')-(NMe)Arg-(NMe)Trp-(NMe)Lys]-NH$_2$

SEQ ID NO: 69 4-phenylbutyryl-His-DPhe-Arg-Trp-Gly-Lys(hex-5-ynoyl)-NH$_2$;

SEQ ID NO: 70 H-Lys(hex-5-ynoyl)-Tyr-Val-Nle-Gly-His-DNal(2')-Arg-DTrp-Asp-Arg-Phe-Gly-NH$_2$ SEQ ID NO: 71 H-Lys(hex-5-ynoyl)-Tyr-Val-Nle-Gly-His-DNal(2')-Arg-DPhe-Asp-Arg-Phe-Gly-NH$_2$ SEQ ID NO: 72 4-phenylbutyryl-His-DPhe-Arg-Trp-NH$_2$ SEQ ID NO: 73 Ac-hornophenylalanine-His-DPhe-Arg-Trp-NH$_2$ SEQ ID NO: 74 4-hydroxycinnamoyl-His-DPhe-Arg-Trp-NH$_2$ SEQ ID NO: 75 H-Tyr-Val-Nle-Gly-His-DNal(2')-Arg-DTrp-Asp-Arg-Phe-Gly-NH$_2$ TABLE 1-continued Non-limiting examples of the MC1R peptide ligand.

| SEQ ID NO: 76 | H-Tyr-Val-Nle-Gly-His-DNal(2')-Arg-DPhe-Asp-Arg-Phe-Gly-NH$_2$ |
|---|---|
| SEQ ID NO: 77 | H-Tyr-Val-Nle-Gly-His-DPhe-Arg-DNal(2')-Asp-Arg-Phe-Gly-NH$_2$ |
| SEQ ID NO: 78 | H-Tyr-Val-Leu-Gly-His-DPhe-Arg-DNal(2')-Asp-Arg-Phe-Gly-NH$_2$ |
| SEQ ID NO: 79 | H-Tyr-Val-ILe-Gly-His-DPhe-Arg-DNal(2')-Asp-Arg-Phe-Gly-NH$_2$ |
| SEQ ID NO: 80 | H-Tyr-Val-Leu-Gly-Pro-Phe-Arg-Trp-Asp-Arg-Phe-Gly-NH$_2$ |
| SEQ ID NO: 81 | H-Tyr-Val-Leu-Gly-Pro-Phe-Arg-Phe-Asp-Arg-Phe-Gly-NH$_2$ |
| SEQ ID NO: 82 | H-Tyr-Val-Leu-Gly-His-Phe-Leu-Trp-Asp-Arg-Phe-Gly-NH$_2$ |
| SEQ ID NO: 83 | H-Tyr-Val-Leu-Gly-His-Phe-Leu-Phe-Asp-Arg-Phe-Gly-NH$_2$ |
| SEQ ID NO: 84 | H-Tyr-Val-Leu-Gly-Pro-Phe-Leu-Trp-Asp-Arg-Phe-Gly-NH$_2$ |
| SEQ ID NO: 85 | H-Tyr-Val-Leu-Gly-Pro-Phe-Leu-Phe-Asp-Arg-Phe-Gly-NH$_2$ |
| SEQ ID NO: 86 | H-Tyr-Val-Leu-Gly-His-Phe-Arg-Trp-Asp-Arg-Phe-Gly-OH |
| SEQ ID NO: 87 | H-Tyr-Val-Leu-Gly-His-Phe-Arg-Trp-Asp-Arg-Phe-Gly-NH$_2$ |
| SEQ ID NO: 88 | H-Tyr-Val-Met-Gly-Pro-Phe-Arg-Trp-Asp-Arg-Phe-Gly-NH$_2$ |

Figure 2:
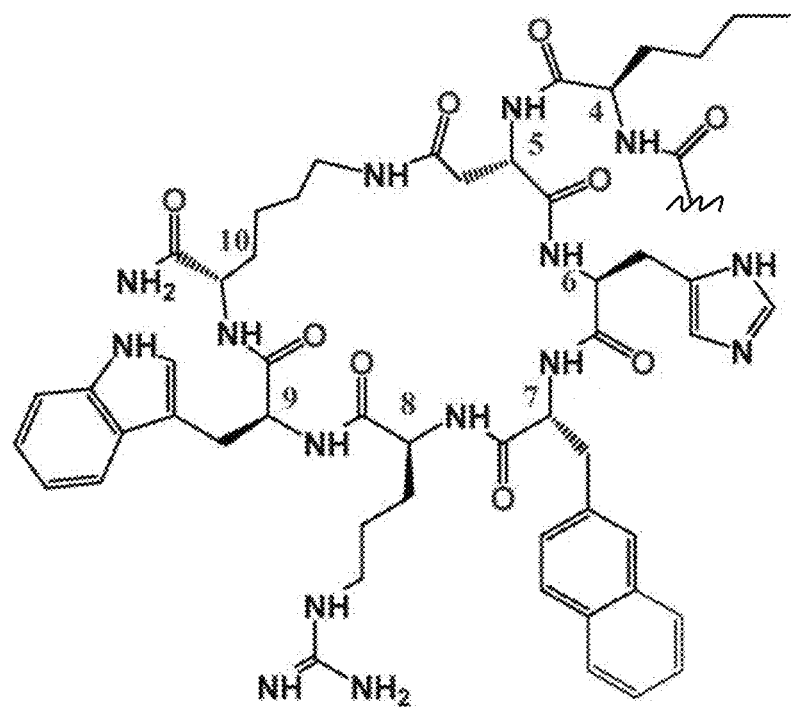
FIG. 2 shows structures of SHU9119 and CPT-SHU9119 conjugate.
Figure 2:
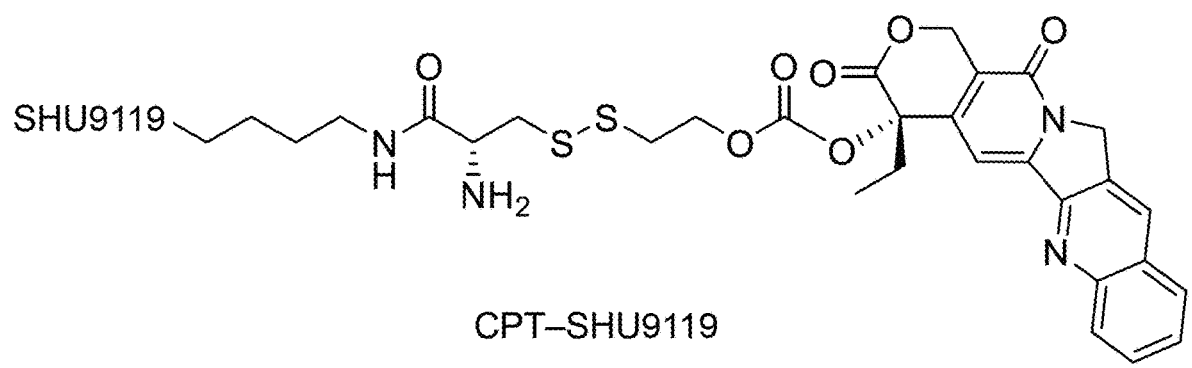

In some embodiments, the MC1R peptide ligand may comprise a derivative that has at least 50% homology to any one of the peptide sequences disclosed herein. In other embodiments, the MC1R peptide ligand comprises a derivative that has at least 60% homology, at least 70% homology, at least 80% homology, or at least 90% homology to any one of the peptide sequences disclosed herein. Non-limiting examples of the ligand-drug conjugate are shown in FIGS. 1 and 2, namely a CPT-MT-II conjugate and a CPT-SHU9119 conjugate, respectively.

In some embodiments, the MC1R peptide ligand may comprise one or more N-methylated amino acid residues. SEQ ID NOs: 7-68 are non-limiting examples of the N-methylated MC1R peptide ligands. As defined herein, the term "N-methylation" refers to a form of alkylation wherein a methyl group, CH$_3$, replaces the hydrogen atom of the NH moiety in an amino acid. As used herein, the term "backbone residue" refers to an amino acid that is part of a cyclic peptide. As used herein, N-methylation of a backbone residue refers to replacing the hydrogen atom of the NH moiety of a backbone residue with CH$_3$.

As used herein, "homology" refers to having structural or sequence similarities (e.g. similar amino acid residue(s)). For example, an amino acid residue of the peptide ligand may be preserved, which is defined as keeping said amino acid in the sequence. However, homology (or preserved) does not imply unmodified. The amino acid may be preserved, but can also be modified. For example, a Histidine residue may be modified to a D-His, N-alkylated His (e.g. N-methylated His), or a β-substituted His. In contrast, a conservative substitution, as known to one of ordinary skill in the art, refers to a complete replacement of an amino acid residue with a different residue having similar biochemical characteristics, such as size, charge, polarity, etc. For example, the aromatic Tyrosine may be conservatively substituted with aromatic phenylalanine, or basic Arginine may be conservatively substituted with basic Lysine.

TABLE 2

Non-limiting examples of conservative amino acid substitutions.

| Original Residue | Conservative Substitutions |
|---|---|
| Ala (A) | Cys, Gly, Ser, Thr, Val |
| Arg (R) | Asn, Gln, Glu, His, Lys |
| Asn (N) | Arg, Asp, Gln, Glu, His, Lys, Ser, Thr |
| Asp (D) | Asn, Gln, Glu, Ser |
| Cys (C) | Ala, Ser |
| Gln (Q) | Arg, Asn, Asp, Glu, His, Lys, Met, Ser |
| Glu (E) | Arg, Asn, Asp, Gln, His, Lys, Ser |
| Gly (G) | Ala, Ser, Glu, Asp |
| Ile (I) | Leu, Met, Phe, Val |
| Leu (L) | Ile, Met, Phe, Val |
| Lys (K) | Arg, Asn, Gln, Glu, Ser |
| Met (M) | Gln, Ile, Leu, Phe, Val |
| Phe (F) | Ile, Leu, Met, Trp, Tyr |
| Pro (P) | None |
| Ser (S) | Ala, Asn, Asp, Gln, Glu, Gly, Lys, Thr |
| Thr (T) | Ala, Asn, Ser, Val |
| Trp (W) | Phe, Tyr |
| Tyr (Y) | His, Phe, Trp, |
| Val (V) | Ala, Ile, Leu, Met, Thr |

β-Substitution

As used herein, β-substitution of an amino acid refers to an amino acid in which the amino group of —NH$_2$ is attached to the secondary carbon rather than the α carbon. For example, a methylene group (CH$_2$) is inserted into the side chain at the beta position of that side chain. Without wishing to limit the invention to a particular theory or mechanism, the incorporation of β-amino acids can produce peptidomimetics that have potent biological activity and are also resistant to proteolysis.

In some embodiments, the spacer may be from aminohexanoic acid and cysteine. The spacer is not limited to this aforementioned example. Preferably, the spacer can be derived from any compound, with or without an amino acid, as long as the resulting spacer can create space between the ligand and drug moiety so as to prevent the drug moiety from interfering with ligand-receptor interactions.

In other embodiments, the cleavable linker may be a biodegradable linker. Examples of the cleavable linker include, but are not limited to, 1,2,3-triazole, an imine, a disulfide, a thioether, a primary amide, or a secondary amide.

In one embodiment, the drug moiety can be any compound that has an —$NH_2$ or —OH group. In some embodiments, the drug moiety may be a cancer drug. For example, the drug moiety is a topoisomerase I inhibitor such as camptothecin. In other embodiments, the drug moiety may be a BRAF, MEK, PD-1, PD-L1, or CTLA-4 inhibitor. Non-limiting examples of the drug moiety include Atezolizumab, Avelumab, Aldesleukin, Binimetinib, Braftovi, Carboplatin, Cemiplimab-rwlc, Cisplatin, Cobimetinib, Dabrafenib Mesylate, Dacarbazine, Diclofenac, Durvalumab, Encorafenib, 5-Fluorouracil, hyaluronic acid, Imiquimod, Imlygic, Ingenol mebutate, Interleukin-2, Ipilimumab, Nivolumab, Paclitaxel, Peginterferon Alfa-2b, Pembrolizumab, Recombinant Interferon Alfa-2b, Sonidegib, Talimogene Laherparepvec, Temozolomide, Trametinib, Vemurafenib, Vinblastine, Vismodegib, and combinations thereof.

In further embodiments, the compositions and methods of the present invention can be advantageously combined with at least one additional diagnostic and/or treatment method including, but not limited to, chemotherapy, radiation therapy, chemical peel, curettage and electrodesiccation, surgery such as cryosurgery, excisional surgery, laser surgery, and Mohs micrographic surgery, photodynamic therapy, laser and light-based treatments, immunotherapy or any other therapy known to those of skill in the art for the treatment and management of a cancer.

As described above, the compositions can be administered to a subject in a pharmaceutically acceptable carrier. By "pharmaceutically acceptable" is meant a material that is not biologically or otherwise undesirable, i.e., the material may be administered to a subject without causing any undesirable biological effects or interacting in a deleterious manner with any of the other components of the pharmaceutical composition in which it is contained. The carrier would naturally be selected to minimize any degradation of the active ingredient and to minimize any adverse side effects in the subject, as would be well known to one of skill in the art.

Pharmaceutical carriers are known to those skilled in the art. These most typically would be standard carriers for administration of drugs to humans, including solutions such as sterile water, saline, and buffered solutions at physiological pH. Typically, an appropriate amount of a pharmaceutically-acceptable salt is used in the formulation to render the formulation isotonic. Examples of the pharmaceutically-acceptable carrier include, but are not limited to, saline, Ringer's solution and dextrose solution. The pH of the solution is preferably from about 5 to about 8, and more preferably from about 7 to about 7.5. Other carriers may include sustained release preparations such as semi-permeable matrices of solid hydrophobic polymers containing the disclosed compounds, which matrices are in the form of shaped articles, e.g., films, liposomes, microparticles, or microcapsules. It will be apparent to those persons skilled in the art that certain carriers can be more preferable depending upon, for instance, the route of administration and concentration of composition being administered. Other compounds can be administered according to standard procedures used by those skilled in the art.

Pharmaceutical compositions can include additional carriers, as well as solvents, dispersion media, coatings, isotonic and absorption delaying agents, thickeners, diluents, buffers, preservatives, surface active agents, and the like in addition to the compounds disclosed herein. Pharmaceutical compositions can also include one or more additional active ingredients such as antimicrobial agents, anti-inflammatory agents, anesthetics, and the like. Supplementary active compounds can also be incorporated into the compositions. Examples of pharmaceutically acceptable salts are organic acid addition salts formed with acids that form a physiological acceptable anion, for example, tosylate, methanesulfonate, acetate, citrate, malonate, tartarate, succinate, benzoate, ascorbate, alpha-ketoglutarate, and alpha-glycerophosphate. Suitable inorganic salts may also be formed, including hydrochloride, sulfate, nitrate, bicarbonate, and carbonate salts. Pharmaceutically acceptable salts may be obtained using standard procedures well known in the art, for example, by reacting a sufficiently basic compound such as an amine with a suitable acid affording a physiologically acceptable anion. Alkali metal (for example, sodium, potassium or lithium) or alkaline earth metal (for example calcium) salts of carboxylic acids can also be made.

The pharmaceutical compositions of the present invention can be administered in a number of ways depending on whether local or systemic treatment is desired, and on the area to be treated. Administration may be topically (including ophthalmically, vaginally, rectally, intranasally, transdermally), orally, by inhalation, or parenterally, for example intravenously (e.g. intravenous drip), subcutaneously, intraperitoneally, intracavity, or intramuscularly (e.g. injection).

Preparations for parenteral administration include sterile aqueous or non-aqueous solutions, suspensions, and emulsions. Examples of non-aqueous solvents are propylene glycol, polyethylene glycol, vegetable oils, and injectable organic-esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Pharmaceutical compositions for topical administration may include ointments, lotions, creams, gels, drops, suppositories, sprays, liquids and powders. Conventional pharmaceutical carriers, aqueous, powder or oily bases, thickeners and the like may be necessary or desirable. In another aspect, the pharmaceutical composition can be administered to a subject transdermally, by using an adherent patch, by using iontophoresis, or by using any other method known to a person of skill. A person of skill, monitoring a subject's clinical response, can adjust the frequency of administration and dosage of the medication according to methods known in the art.

Pharmaceutical compositions for oral administration include, but are not limited to, powders or granules, suspensions or solutions in water or non-aqueous media, capsules, lozenges, sachets, or tablets. Thickeners, flavorings, diluents, emulsifiers, dispersing aids or binders may be desirable. A person of skill, monitoring a subject's clinical response, can adjust the frequency of administration and dosage of the medication according to methods known in the art.

In one aspect, the pharmaceutical composition can be administered to a subject intranasally, e.g. by using a nasal spray, atomizer, dropper, or syringe. In another aspect, the pharmaceutical composition can be administered to a subject intramuscularly, e.g. by using muscular injections or electroporation. A person of skill, monitoring a subject's clinical response, can adjust the frequency of administration and dosage of the medication according to methods known in the art.

It is advantageous to formulate the compositions in dosage units for ease of administration and uniformity of dosage. Dosage units refer to physically discrete units suited as unitary dosages for the subject to be treated. Each unit contains a predetermined quantity of the ligand-drug conjugate calculated to produce the desired therapeutic effect in association with the required pharmaceutical carrier.

Toxicity and therapeutic effects of the ligand-drug conjugates can be determined by standard pharmaceutical procedures in cell cultures or experimental animals, e.g. for determining the $LD_{50}$ (the dose lethal to 50% of the population) and the $ED_{50}$ (the dose therapeutically effective in 50% of the population). Suitable animal models known in the art can be designed and used by one skilled in the art. The dose ratio between toxic and therapeutic effects is the therapeutic index and it can be expressed as the ratio $LD_{50}/ED_{50}$. The ligand-drug conjugates that exhibit high therapeutic indices are preferred. Care should be taken to design a delivery system that minimize potential damage to unaffected cells and thereby reduce side effects. Data obtained from the cell culture assays and animal studies can be used in formulating a range of dosage for use in humans. The dosage of the ligand-drug conjugates lies preferably within a range of circulating concentrations that include the $ED_{50}$ with little to no toxicity.

The dosage may vary within this range depending upon the dosage form employed and the route of administration utilized. The therapeutically effective dose can be estimated initially from cell culture assays in which, e.g., the rate of cell uptake or cell death is observed. A dose may be formulated in animal models to achieve a concentration range that includes the $IC_{50}$ (i.e., the concentration of the test compound which achieves a half-maximal inhibition of symptoms) as determined in cell culture. Such information may be used to more accurately determine useful doses in humans.

In some embodiments, the ligand-drug conjugates may be administered in a dosage of about 0.001 mg/kg to 100 mg/kg of body weight. For example, the dosage of the ligand-drug conjugates may range from about 0.001 mg/kg to 0.01 mg/kg of body weight, or about 0.01 mg/kg to 0.1 mg/kg of body weight, or about 0.1 mg/kg to 1 mg/kg of body weight, or about 1 mg/kg to 5 mg/kg of body weight, or about 5 mg/kg to 10 mg/kg of body weight, or about 10 mg/kg to 20 mg/kg of body weight, or about 20 mg/kg to 50 mg/kg of body weight, or about 50 mg/kg to 100 mg/kg of body weight, including any range in between.

In other embodiments, the composition may be administered twice a day, daily, every other day, weekly, bi-monthly, monthly, or at any interval in between. In further embodiments, the composition may be administered periodically for a set period of time, e.g. once per week for about 1 to 10 weeks. The composition may also be administered chronically. For instance, the composition may also be administered over an extended period of time to the subject, e.g., over the subject's lifetime. A skilled artisan will appreciate that certain factors may influence the dosage and timing required to effectively treat a subject, including but not limited to the severity of the disease or disorder, previous treatments, weight, general health and/or age of the subject, and other diseases present. Moreover, treatment of a subject with a therapeutically effective amount of the pharmaceutical composition can include a single treatment or, preferably, a series of treatments. Further still, if a subject does not respond to the initial dosage and administration of the pharmaceutical composition, a person of skill can administer the medication daily for several days until such response occurs. A person of skill can monitor a subject's clinical response to the administration of the pharmaceutical composition, and administer additional dosages or increase the dosages as needed.

The pharmaceutical compositions of the invention can be included in a container, pack, or dispenser together with instructions for administration. For example, the instructions can include directions to use the composition to treat an individual having or at risk for skin cancer.

EXAMPLE

The following is a non-limiting example of the present invention. It is to be understood that said example is not intended to limit the present invention in any way. Equivalents or substitutes are within the scope of the present invention.

To create opportunities to utilize cytotoxic drugs that are less likely to result in therapeutic resistance by the tumor, but lack selectivity to melanoma cells, ligand-targeted therapies were synthesized and tested using melanotan-II (MT-II (SEQ ID NO: 4)) to target MC1R-overexpressing melanoma. The drug-MT-II conjugates were shown to maintain strong binding interactions to MC1R and induce selective drug delivery to A375 melanoma cells through its MT-II moiety in vitro. Furthermore, with camptothecin as the therapeutic drug, camptothecin-MT-II (1) was demonstrated to effectively inhibit A375 melanoma cell growth with an IC50 of 16 nM. By providing selectivity to melanoma cells through its MT-II moiety, the approach of drug-MT-II conjugates can allow many more options for cytotoxic drug selection, which can be the key to solve the cancer resistant problem for melanoma.

Design of Drug-MT-II Conjugates

α-MSH is a linear peptide with a short half-life of around 10 minutes. To maintain a reasonable serum stability of the final conjugate molecule, the cyclized peptide MT-II (SEQ ID NO: 4), which has an enhanced half-life of 1.5 hours, was used for MC1R targeting. MT-II has previously been shown to induce β-arrestin mediated receptor internalization of MC1R. The linker was designed to have a disulfide bond, which can be reduced by the excessive amount of glutathione inside the endosome. Once reduced, the thiol group in the intermediate 15 can carry out intramolecular nucleophilic attack to release the free drug 11 through two slightly different mechanisms (Scheme 1). A 6-aminohexanoic acid was introduced as part of the linker to create space and prevent the cytotoxic drug from interfering with ligand-receptor interactions. The topoisomerase I inhibitor camptothecin (CPT, 11) was selected as the cytotoxic drug in the design of CPT-MT-II conjugate (1, FIG. 1). The ability of the drug-MT-II conjugate scaffold to selectively target melanoma cells was tested by replacing the therapeutic drug with a fluorescent probe fluorescein (12) in the design of fluorescein-MT-II conjugate (2).

major peak of all compounds accounted for ≥95% of the combined total peak area monitored by a UV detector at 254 nm. Cells were grown in minimum essential medium (MEM, Gibco) supplemented with 10% FBS, 1% penstrep and 1 mM sodium pyruvate at 37° C. and 5% $CO_2$.

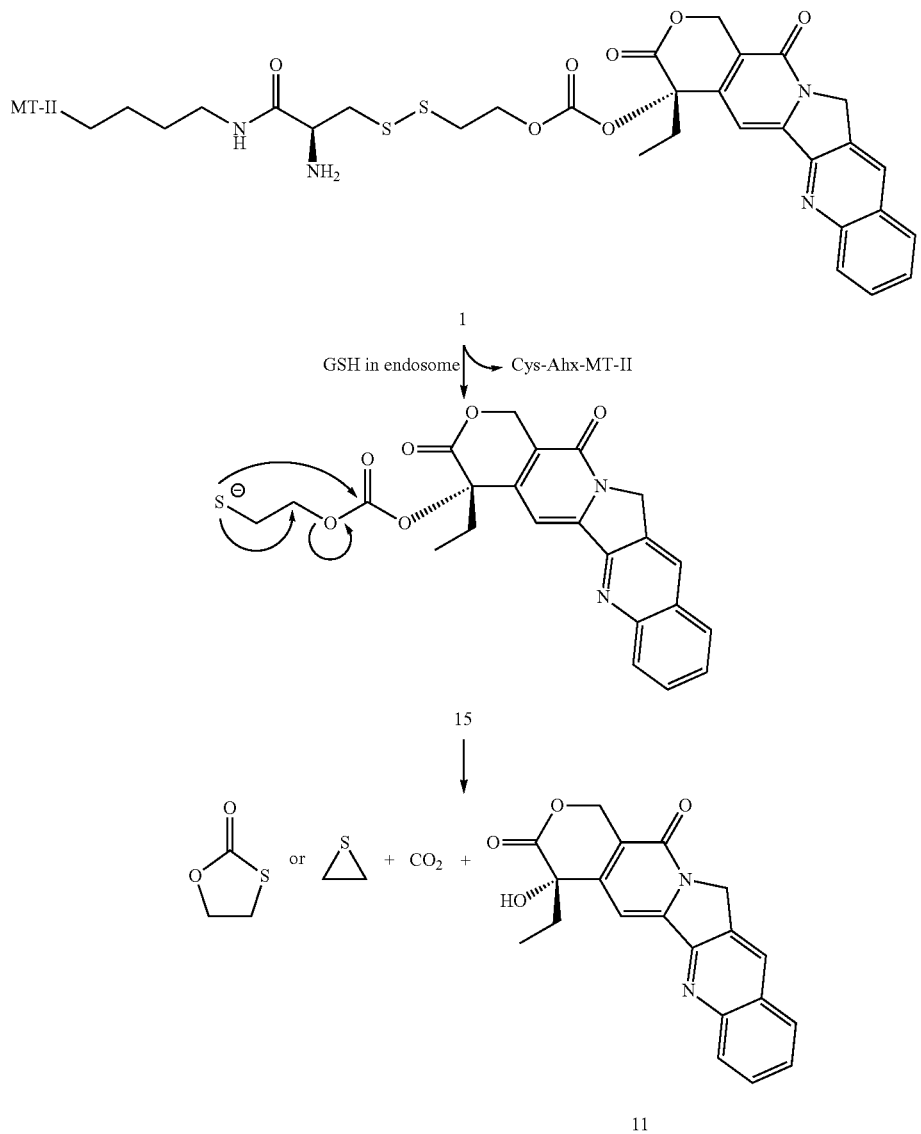

Scheme 1. Proposed mechanism of disulfide-mediated release of camptothecin from MC1R targeting prodrugs in the endosome of melanoma cells.

Synthesis of Drug-MT-II Conjugates

Organic solvents and reagents were purchased from Aldrich and used without further purification. ESI-MS was performed with the Bruker amaZon ion trap system. Reverse-phase high-performance liquid chromatography (RP-HPLC) was performed with Agilent 1100 series. Semi-preparative RP-HPLC on a C18 bonded silica column (Vydac 218TP152022, 250_22 mm, 15-20 μm, 300 Å) was used for compound purification and to analyze the purity, eluted with a linear gradient of acetonitrile (gradient, 2-100% B in A over 40 min, flow rate 3 mL/min). System 1: solvent A, 0.1% TFA in water; solvent B, 0.08% TFA in acetonitrile. System 2: solvent A, 1% formic acid in water; solvent B, 1% formic acid in methanol) and aqueous 0.1% TFA (v/v). The

Synthesis of linker-MT-II: Cys-6-Ahx-Nle-c[Asp-His-D-Phe-Arg-Trp-Lys]-NH₂ (3)

Scheme 2 shows the Fmoc solid-phase peptide synthesis used to prepare the linker-MT-II peptide 3. After the linear peptide Fmoc-Cys(Trt)-6-Ahx-Nle-Asp(Allyl)-His(Trt)-D-Phe-Arg(Pbf)-Trp(Boc)-Lys(Alloc) was synthesized on rink amide resin, the side chain protecting groups on Asp and Lys residues were removed using standard Allyl/Alloc deprotection method, and side-chain-to-side-chain cyclization was performed. Fmoc deprotection and TFA cleavage were further carried out to produce the linker-MT-II peptide 3.

Scheme 2. Synthesis of the linker-MT-II peptide 3.
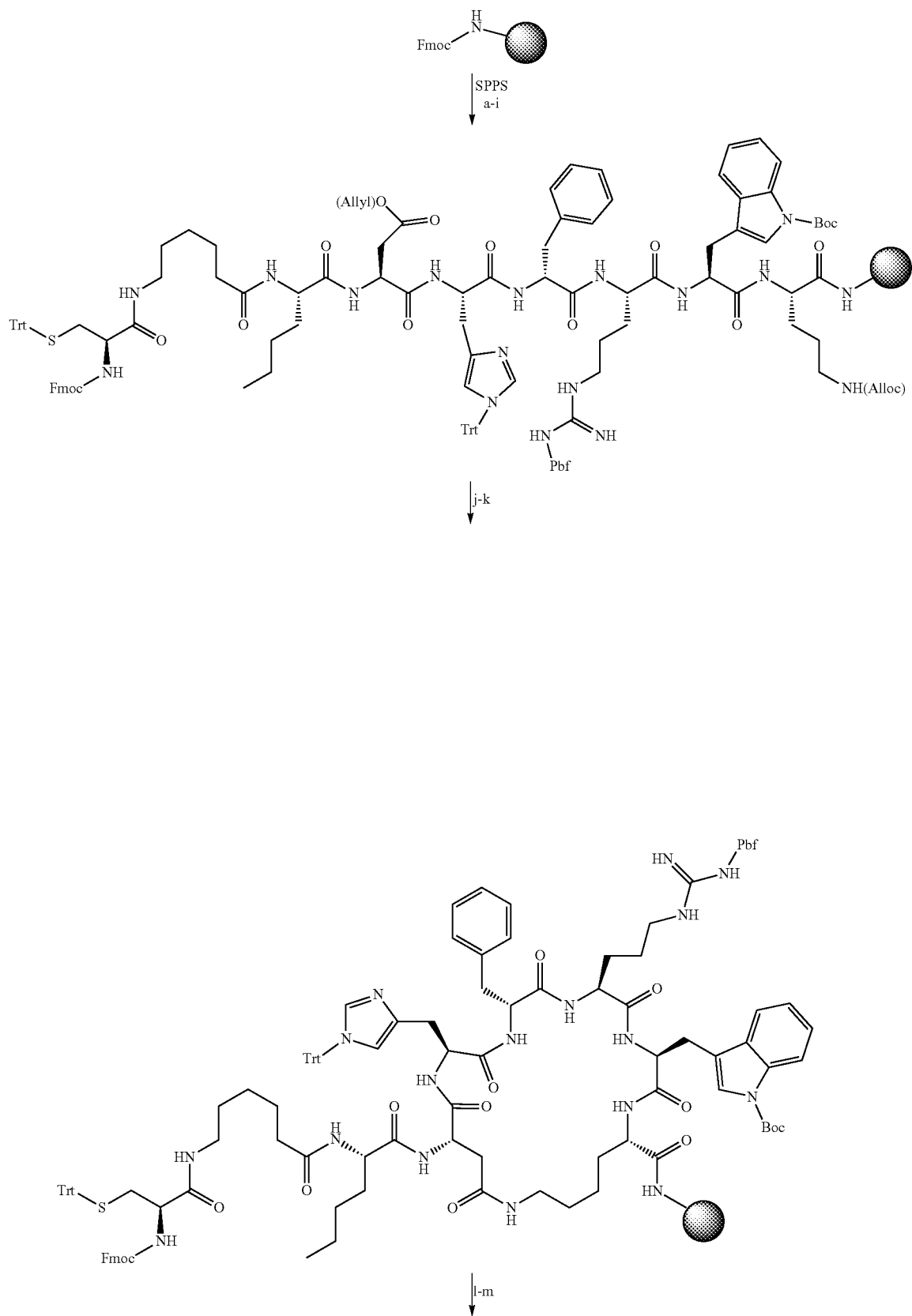

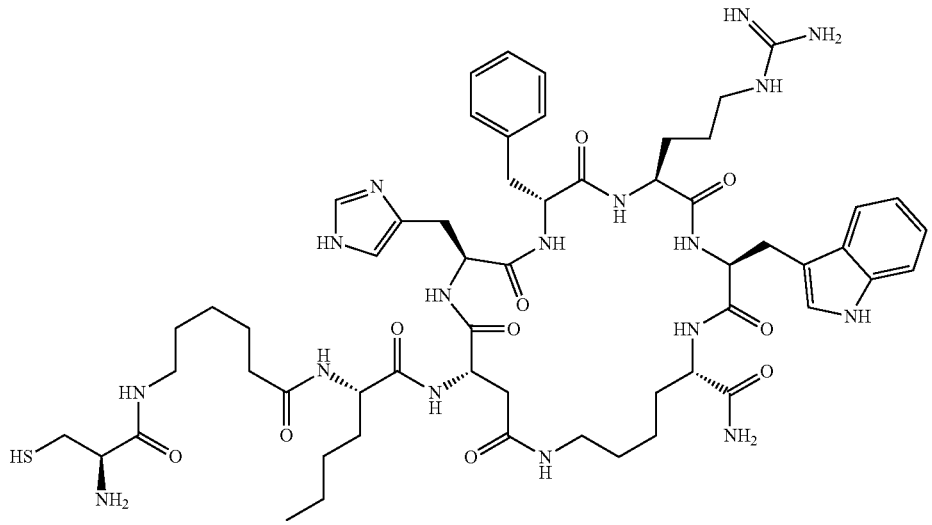

3

Reagents and conditions:
(a) 20% piperidine/DMF, 20 min; Fmoc-Lys(Alloc)-OH, HCTU, DIPEA/DMF, 1 h.
(b) 20% piperidine/DMF, 20 min; Fmoc-Trp(Boc)-OH, HCTU, DIPEA/DMF, 1 h.
(c) 20% piperidine/DMF, 20 min; Fmoc-Arg(Pbf)-OH, HCTU, DIPEA/DMF, 1 h.
(d) 20% piperidine/DMF, 20 min; Fmoc-d-Phe-OH, HCTU, DIEPA/DMF, 1 h.
(e) 20% piperidine/DMF, 20 min; Fmoc-His(Trt)-OH, HCTU, DIPEA/DMF, 1 h.
(f) 20% piperidine/DMF, 20 min; Fmoc-Asp(Allyl)-OH, HCTU, DIPEA/DMF, 1 h.
(g) 20% piperidine/DMF, 20 min; Fmoc-Nle-OH, HCTU, DIPEA/DMF, 1 h.
(h) 20% piperidine/DMF, 20 min; Fmoc-6-Ahx-OH, HCTU, DIPEA/DMF, 1 h.
(i) 20% piperidine/DMF, 20 min; Fmoc-Cys(Trt)-OH, HCTU, DIPEA/DMF, 1 h.
(j) PhSiH3, Pd(PPh3)4/DCM, 1 h.
(k) HCTU, DIPEA/DMF, 2 h.
(l) 20% piperidine/DMF, room temperature, 20 min.
(m) TFA:TIS:H2O (95:2.5:2.5), 3 h.

Nα-Fmoc-amino acids were obtained from GL Biochem and ChemCruz. The side chain protected amino acids were Fmoc-Cys(Trt)-OH, Fmoc-Asp(OAll)-OH, Fmoc-His(trt)-OH, Fmoc-Arg(pbf)-OH, Fmoc-Trp(Boc)-OH and Fmoc-Lys(Alloc)-OH. Fmoc-Rink amide resin was purchased from Novabiochem. All peptides were synthesized by the N-Fmoc solid-phase peptide strategy using DIEA and HCTU as the coupling reagents. Rink amide resin (0.37 mmol/g) was placed into a 5 mL polypropylene syringe with a frit on the bottom and swollen in DCM (2 mL) and DMF (2 mL) for 1 h. The Fmoc protecting group on the Rink linker was removed by 20% piperidine in DMF. After 20 min, the solution of piperidine was removed and the resin was washed with DMF (2 mL, 4 times) and DCM (2 mL, 4 times). N-Fmoc amino acid (3 equiv) and HCTU (3 equiv) were dissolved in DMF, and then DIEA (3 equiv) was added. The coupling mixture was transferred into the syringe with the resin and shaken for 1 h. Coupling completion was monitored with a Kaiser test. The coupling mixture was removed, and the resin was washed with DMF (2 mL, 4 times) and DCM (2 mL, 4 times). N-Fmoc groups were removed with 20% piperidine in DMF in 20 min. Each coupling and deprotection step was repeated until a linear peptide was assembled.

Allyl and Alloc deprotection was carried out by adding Pd(PPh3)4 (0.35 equiv) and PhSiH3 (20 equiv) in DCM under argon. The deprotecting solution was left to react in presence of Argon and shaken for 30 min. Next, the peptide resin was washed four times with DCM and the process was repeated once. The subsequent cyclization was performed by adding HCTU (3 equiv) and DIEA (3 equiv) in DMF for 2 h. The N-Fmoc group on Cys residue was removed with 20% piperidine in DMF for 20 min. The final wash of the resin was done with DMF (2 mL, four times) and DCM (2 mL, four times). The product was cleaved from the resin with a mixture of 95% TFA, 2.5% TIPS, and 2.5% water during 3 h. Side chain protecting groups were removed during the cleavage step as well. The cleaved mixture was evaporated on a rotary evaporator, and the crude peptide was dissolved in $H_2O$/methanol and purified by HPLC before lyophilized. m/z calculated: 1197.62 m/z observed: 1198.78 $(M+H)^+$.

Synthesis of Carbonate Linker: 1H-Benzo[d][1,2,3]triazol-1-yl[2-(pyridin-2-yldisulfanyl)-ethyl]Carbonate (10)

The synthesis of the carbonate linker 10 is shown in Scheme 3. Compound 5 with a sulfenyl chloride functional group was added to 2-mercaptoethanol (4) to form the disulfide bond. A disulfide exchange reaction was performed with pyridine 6 in DCM at reflux to yield alcohol 7. Carbonylation was achieved with triphosgene (8) added to 7, which was followed by ester exchange reaction with hydroxybenzotriazole (9) to yield to carbonate linker 10. The synthesis of 10 was modified based on previously reported procedures.

Scheme 3. Synthesis of linker 10.

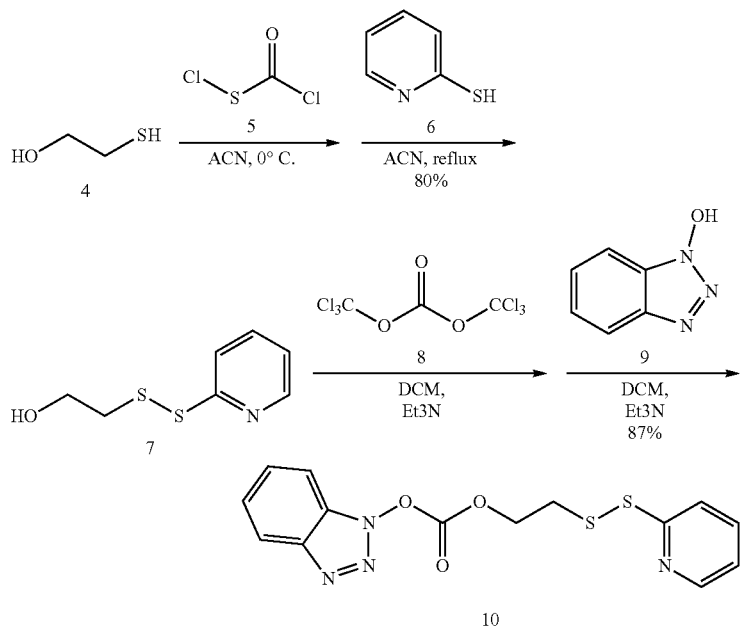

2-Mercaptoethanol (4) (0.77 g, 9.9 mmol) was dissolved in 5 mL CH₃CN, and the solution was added dropwise to a solution of chlorocarbonylsulfenyl chloride (5) (1.30 g, 9.9 mmol) in 8 mL CH₃CN precooled at 0° C. The solution was stirred at 0° C. for 30 min. A solution of 2-mercaptopyridine (6) (1.00 g, 9.0 mmol) in 20 mL CH₃CN was added dropwise to the solution, and the mixture was stirred at reflux for 2 h, during which a white precipitate formed. The mixture with white precipitate was then stirred at 0° C. for 1 h and filtered. The filter cake was washed with CH₃CN to provide the compound 7 as a white amorphous solid (1.35 g, 80%). Compound 7 (1.00 g, 4.47 mmol) was dissolved in CH₂Cl₂ (5 mL) and Et₃N (0.45 g, 4.47 mmol) and added dropwise to a solution of triphosgene (8) (0.44 g, 1.49 mmol) at 0° C. The solution was stirred at room temperature for 1.5 h, followed by dropwise addition of a solution of hydroxybenzotriazole (9) (0.60 g, 4.47 mmol) in CH₂Cl₂ (10 mL) and Et₃N (0.45 g, 4.47 mmol). The mixture was then stirred at room temperature for 16 h and then diluted with CHCl₃ to 50 mL and washed with H₂O (100 mL×3) and brine (100 mL). The organic layer was dried over anhydrous Na₂SO₄, filtered, and concentrated. The resulting yellow oil was triturated with hexane and filtered to provide the product 10 as a white solid (1.36 g, 87%). ¹H NMR (400 MHz, CDCl₃) δ 3.28 (t, J=6.4 Hz, 2H), 4.83 (t, J=6.4 Hz, 2H), 7.11 (ddd, J=1.3, 7.2, 8.1 Hz, 1H), 7.57 (ddd, J=1.2, 7.2, 8.2 Hz, 1H), 7.67 (ddd, J=0.9, 1.7, 8.0 Hz, 1H), 7.71 (dt, J=1.3, 8.1 Hz, 1H), 7.79 (ddd, J=1.3, 7.3, 8.4 Hz, 1H), 8.05 (ddd, J=0.9, 1.8, 8.0 Hz, 1H), 8.23 (ddd, J=0.9, 1.8, 8.0 Hz, 1H), 8.46 (ddd, J=0.9, 1.7, 8.1 Hz, 1H).

Synthesis of MT-II Conjugates

Scheme 4 shows the final steps to the synthesis of the CPT-MT-II conjugate (1) and fluorescein-MT-II conjugate (2). The hydroxyl group on CPT (11) was connected to the carbonate linker 10 through nucleophilic substitution, yielding CPT-linker compound 13. A thiol-disulfide exchange reaction was then performed between the disulfide groups on 13 and the thiol group on the Cys residue of the linker-MT-II peptide 3 to yield the CPT-MT-II conjugate (1). Similarly, the hydroxyl group on fluorescein (12) reacted with the carbonate linker 10 to form the fluorescein-linker compound 14, which further reacted with the linker-MT-II peptide 3 to yield the fluorescein-MT-II conjugate (2).

Scheme 4. Synthesis of the CPT-MT-II conjugate (1) and fluorescein-MT-II conjugate (2).

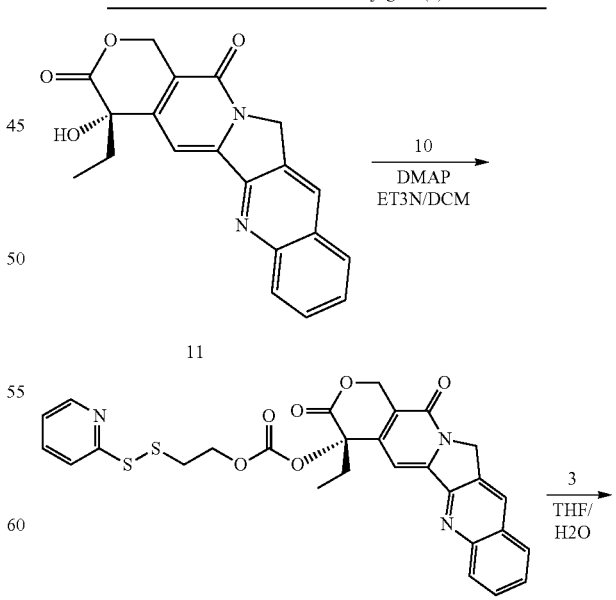

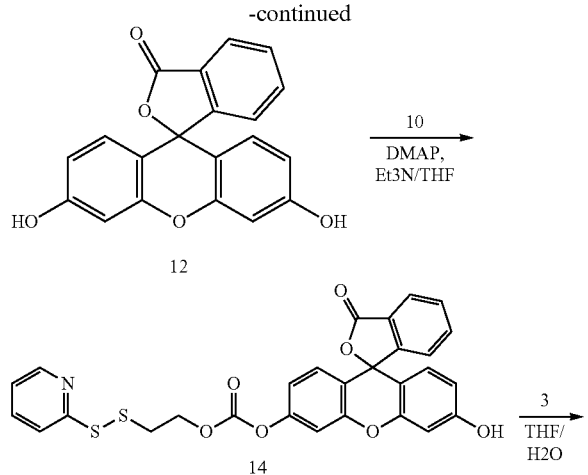

Synthesis of CPT-Linker Compound (13)

Referring to the top scheme in Scheme 4, camptothecin (11, 25 mg, 0.07 mmol) was dissolved in $CH_2Cl_2$ (5 mL), followed by addition of carbonate reagent 10 (37 mg, 0.10 mmol), DMAP (9.1 mg, 0.07 mmol), and $Et_3N$ (15 mg, 0.15 mmol). The mixture was stirred at room temperature overnight, purified by semi-preparative RP-HPLC and lyophilized to provide the product 13 as a yellow solid (37.2 mg, 95%). m/z calculated: 561.10. m/z observed: 562.21 $(M+H)^+$. $^1H$ NMR (400 MHz, $CDCl_3$) δ 1.00 (t, J=7.5 Hz, 3H), 2.32 (m, 2H), 3.06 (t, J=6.6 Hz, 3H), 4.36 (m, 2H), 5.3 (s, 2H), 5.53 (s, 2H), 7.03 (m, 1H), 7.33 (s, 1H), 7.65 (m, 3H), 7.83 (m, 1H), 7.94 (d, J=8.2 Hz, 1 H), 8.22 (d, J=8.6 Hz, 1H), 8.39 (s, 1H), 8.41 (d, J=4.7 Hz, 1H).

Synthesis of CPT-MT-II (1)

Continuing the top scheme of Scheme 4, linker-MT-H peptide (3, 6.11 mg, 0.0050 mmol) was dissolved in argon-purged, saturated sodium bicarbonate solution (1 mL). A solution of CPT-linker compound 13 (2.86 mg, 0.0050 mmol) in THF (1 mL) was added dropwise to the reaction mixture, and the solution was stirred for 30 min. The product CPT-MT-II (1) was purified by preparative RP-HPLC and lyophilized to provide as a yellow solid (4.21 mg, 51%). m/z calculated: 1647.71. m/z observed: 1649.19 $(M+H)^+$.

Synthesis of Fluorescein-Linker Compound (14)

Referring to the bottom scheme in Scheme 4, fluorescein (12, 33 mg, 0.10 mmol) was dissolved in THF (5 mL), followed by addition of carbonate reagent 10 (40 mg, 0.12 mmol), DMAP (13 mg, 0.10 mmol), and $Et_3N$ (21 mg, 0.21 mmol). The mixture was stirred at room temperature overnight and purified by semi-preparative RP-HPLC and lyophilized to provide 14 as a yellow solid (38.0 mg, 70%). m/z calculated: 545.06. m/z observed: 568.16 $(M+Na)^+$. $^1H$ NMR (400 MHz, $CDCl_3$) δ 3.15 (t, J=6.5 Hz, 2H), 3.78 (s, 1H), 4.53 (dt, J=6.5, 1.7 Hz, 2H), 6.56 (dd, J=8.6, 2.4 Hz, 1H), 6.63 (dd, J=8.6, 3.7 Hz, 1H), 6.74 (dd, J=7.1, 2.4 Hz, 1H), 6.82 (dd, J=17.8, 8.6 Hz, 1H), 6.86 (dd, J=8.6, 2.3 Hz, 1H), 6.91 (dd, J=8.6, 2.3 Hz, 1H), 7.15 (m, 3H), 7.66 (m, 4H), 8.03 (m, 1H), 8.49 (m, 1H).

Synthesis of Fluorescein-MT-II (2)

Continuing the bottom scheme of Scheme 4, linker-MT-II peptide (3, 1.33 mg, 0.0011 mmol) was dissolved in argon-purged, saturated sodium bicarbonate solution (0.5 mL). A solution of fluorescein-linker compound 14 (0.93 mg, 0.0017 mmol) in THF (0.5 mL) was added dropwise to the reaction mixture, and the solution was stirred for 30 min. The product fluorescein-MT-II (2) was purified by preparative RP-HPLC and lyophilized to provide as a yellow solid (1.02 mg, 57%). m/z calculated: 1631.67. m/z observed: 816.91 $(M+2H)^{2+}$.

Competitive Binding Assays

Competitive binding assays were performed on whole cells. Stably transfected HEK293 cell lines overexpressing human MC1R, MC3R, MC4R or MC5R were seeded on 96-well plates 48 h before the assay and grown to 100,000 cells per well. For the assay, the medium was removed, and cells were washed twice with a binding buffer containing minimum essential medium with Earle's salt (MEM, GIBCO), 25 mM HEPES (pH 7.4), 0.2% bovine serum albumin, 1 mM 1,10-phenanthrolone, 0.5 mg/L leupeptin and 200 mg/L bacitracin. Cells were incubated with different concentrations of unlabeled test compounds and $^{125}I$ labelled NDP-α-MSH (PerkinElmer, 100,000 cpm/well, 0.1386 nM) for 40 min at 37° C. The medium was subsequently removed, and the cells were washed twice with the binding buffer. The cells were lysed by 50 μL of 0.1 mM NaOH and 50 μL of 1% Triton X-100. The plates were left dry overnight under the hood, and 50 μL of scintillation fluid (OptiPhase SuperMix, PerkinElmer) were added in each well. The radioactivity was measured using MicroBeta 2 microplate counter (PerkinElmer). Data were analyzed using Graphpad Prism 6 (Graphpad Software, San Diego, CA).

Confocal Microscopy 1 mL of A375 or HEK293 cell suspension (~5×10$^4$ cells) were seeded in 35 mm No. 1.5 coverslip glass-bottomed microwell dish (MatTek) and cultured overnight. Cells were gently washed with PBS twice and treated with compound 2 (3 μM) with or without MT-II (30 μM) in phenol red-free, HEPES-supplemented DMEM. After incubation at 37° C. for indicated time, cells were washed three times with PBS before imaging. Images were taken with Zeiss LSM880 inverted confocal microscope with either bright field or laser at 488 nM with 2% laser power and Plan-Apochromat 63×/1.4 Oil DIC M27 objective.

XTT cell Viability Assay

A375 cells were seeded in 96 well plates at a density of around 10$^5$ cells per well in 95 μL of MEM medium and incubated for 24 h, Cells were treated with 5 μL of drugs in a final concentration of 0, 0.3 nM, 1 nM, 3 nM, 10 nM, 30 nM, 100 nM and 300 nM for 24 h. XTT solution was prepared by dissolving 4 mg XTT in 4 mL MEM medium. PMS solution was prepared by dissolving 3 mg of PMS in 1 mL of phosphate buffer saline (PBS). 10 μL of PMS solution was added to 4 mL of XTT solution, and 25 μL of the PMS/XTT mixture was added to each well. The plate was incubated at 37 ° C. for another 2 h culture. Absorbance was measured at 450 nm using a pQuant Universal Microplate Reader (Bio-Tek instruments, Inc., Winooski, VT). Absorbance from no-cells control was subtracted and the percentage of cell viability was calculated as the percentage of absorbance relative to cells treated with medium.

Results

Figure 3:
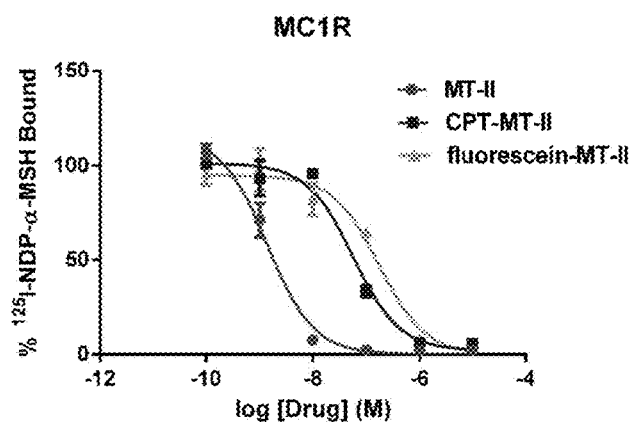
FIG. 3 shows competitive binding assay results of MT-II, CPT-MT-II (1) and fluorescein-MT-II (2) binding to MC1R in competition with $^{125}$I labelled NDP-α-MSH.

Binding of CPT-MT-II (1) and Fluorescein-MT-II (2) Conjugates to Melanocortin Receptors To evaluate binding affinity of CPT-MT-II (1) and fluorescein-MT-II (2) to MC1R, competitive binding assays were performed on human MC1R overexpressing HEK293 cells with $^{125}$I labelled NDP-a-MSH as the competing ligand (FIG. 3, Table 3). The K values of CPT-MT-II and fluorescein-MT-II binding to MC1R were determined to be 57 nM and 172 nM respectively, while the K value of MT-II was shown to be 1.4 nM. Despite having lower binding affinities than MT-II, both CPT-MT-II and fluorescein-MT-II were demonstrated to be able to fully displace NDP-α-MSH within micromolar range concentration. As MT-II is not selective to MC1R and can also bind to and activate other melanocortin receptors, the binding affinity of CPT-MT-II and MT-II to MC3R, MC4R and MC5R were determined through competitive binding assays with $^{125}$I labelled NDP-α-MSH. Interestingly, CPT-MT-II was demonstrated to be around 3-6-fold more selective to MC1R as compared to MC3R, MC4R and MC5R (Table 3).

TABLE 3

Ki values of MT-II, CPT-MT-II (1), and fluorescein-MT-II (2) binding to melanocortin receptors.

| | Ki (nM) (ND: not determined) | | | |
|---|---|---|---|---|
| Compounds | MC1R | MC3R | MC4R | MC5R |
| MT-II | 1.5 ± 0.2 | 1.3 ± 0.2 | 1.4 ± 0.2 | 2.9 ± 0.3 |
| CPT-MT-II (1) | 57 ± 7 | 300 ± 34 | 173 ± 48 | 194 ± 10 |
| fluorescein-MT-II (2) | 172 ± 20 | ND | ND | ND |

Confocal Microscopy of A375 and HEK293 Cells Treated with Fluorescein-MT-II

Figure 4:
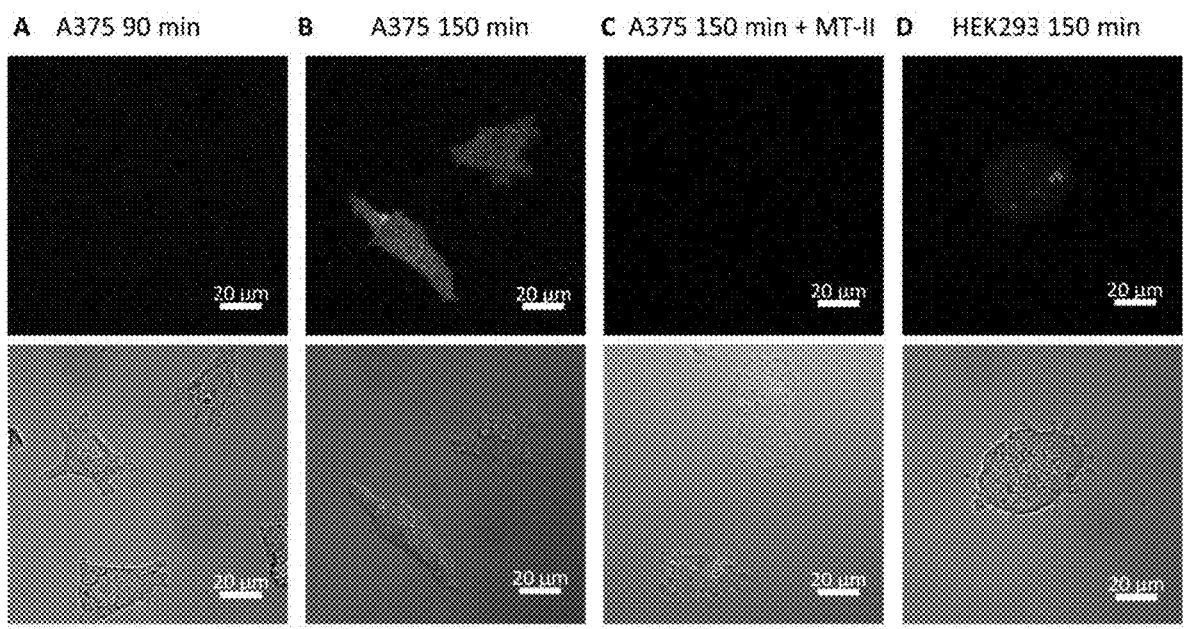
FIG. 4 shows live-cell confocal microscopic images of A375 (A-C) and HEK293 (D) cells treated with 3 µM of fluorescein-MT-II (2) with or without 30 µM of MT-II for the indicated periods of time.

Referring to FIG. 4, to analyze the ability of drug-MT-II conjugate scaffold to release drug into melanoma cells, A375 malignant melanoma cells were treated with 3 µM of fluorescein-MT-II (2) for 0.5 h, 1.5 h or 2.5 h. The media with excess fluorescein-MT-II was washed away, and the intracellular fluorescence was monitored by live-cell confocal microscopy under the same microscope settings. No significant fluorescence uptake was observed when A375 cells were treated for 0.5 h (data not shown) or 1.5 h (A). After 2.5 h incubation, strong fluorescence was observed to be evenly distributed inside A375 cells (B). To test if the fluorescence uptake was mediated by ligand-receptor interactions between MC1R and the MT-II moiety of fluorescein-MT-II (2), A375 cells were simultaneously treated with 3 µM of fluorescein-MT-II (2) and 30 µM of MT-II for 2.5 h and examined under confocal microscopy. With excess amount of MT-II present to occupy the MC1R binding sites, fluorescence uptake by A375 cells was not observed (C), suggesting that ligand-receptor interactions between MC1R and fluorescein-MT-II is crucial to deliver fluorescein into A375 cells.

To test if drug-MT-II conjugate scaffold also releases the therapeutic drug into healthy non-cancer cells, HEK293 kidney epithelial cells were treated with 3 µM of fluorescein-MT-II (2) for 2.5 h and monitored under confocal microscope. The results demonstrated fluorescence uptake by HEK293 cells with much weaker fluorescence intensity compared to uptake by A375 cells (D), suggesting a selective delivery of fluorescein into melanoma cells using fluorescein-MT-II. Taken together, these results imply that drug-MT-II conjugate scaffold can selectively deliver the therapeutic drug into the cytoplasm of melanoma cells through interactions between its MT-II moiety and MC1R on melanoma cells.

Cytotoxicity Studies of A375 Treated with CPT, CPT-MT-II (1) and MT-II

Figure 5:
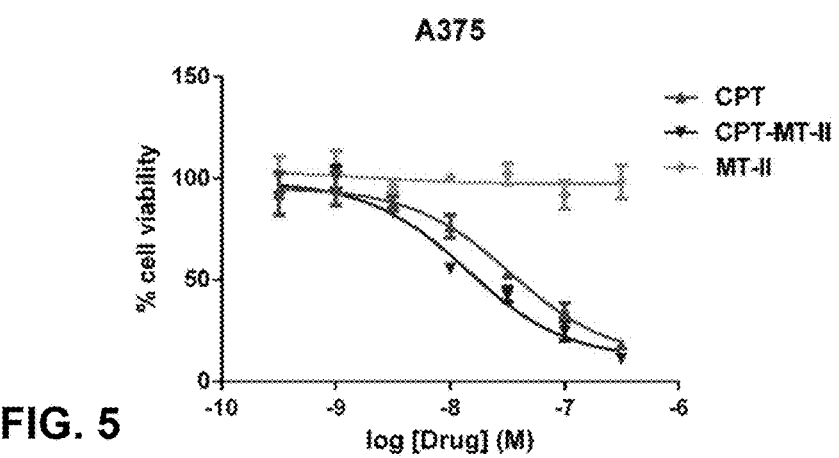
FIG. 5 shows a dose-response XTT cell viability assay of camptothecin (CPT, 11), CPT-MT-II conjugate (1) and MT-II on the cell viability of human A375 melanoma cell line after 24 h incubation.

Referring to FIG. 5, to demonstrate the ability of drug-MT-II conjugates to kill melanoma cells, A375 malignant melanoma cells were treated with different concentrations of camptothecin (CPT, 12) and CPT-MT-II (1) for 24 h, and the cell viability was measured with XTT assay. The results suggest that both CPT and CPT-MT-II can effectively kill A375 melanoma cells, while MT-II alone does not have any impact on melanoma cell viability. CPT-MT-II has an enhanced cytotoxicity with an 1050 value of 16±2 nM, as compared to the $IC_{50}$ value of CPT (47±2 nM). Camptothecin has poor solubility. Thus, without wishing to limit the present invention, the enhanced potency of the CPT-MT-II conjugate is possibly due to improved solubility and cell membrane penetration of CPT-MT-II.

The competitive binding assay suggests that both CPT-MT-II (1) and fluorescein-MT-II (2) can bind to MC1R and fully displace the radioligand $^{125}$I-NDP-α-MSH. In some embodiments, intramolecular interactions between CPT/fluorescein and MT-II are reduced by using longer and more hydrophilic spacers. Using confocal microscopy, it was shown that the release of fluorescein from fluorescein-MT-II (2) into A375 takes at least 90 minutes. The proposed drug release mechanism for ligand-drug conjugates includes, but is not limited to, conjugate binding to the receptor, endocytosis, release of the cleavable linker and diffusion of the drug through the membrane of the lysosome. Even though the process of MT-II binding to the MC1R and causing endocytosis was shown to happen within 10 min, the half time of reducing the disulfide bond in ligand-drug conjugates in the presence of glutathione was demonstrated to be 1 hour. Considering the excessive time required for fluorescein to penetrate the membrane of the lysosome, 90 min to 150 min is a reasonable time window for drug-MT-II conjugates to deliver the drug into melanoma cells.

Because selective delivery to MC1R overexpressing melanomas is provided by the MT-II motif of the drug-MT-II conjugate, a wide range of therapeutic drugs may be used in accordance with the present invention. From a synthetic perspective, in some embodiments, any cytotoxic drug with an —NH$_2$ or —OH group can be used for drug-MT-II conjugates through the same synthetic strategies. To achieve maximum killing of cancer cells, drugs with high potency are favored due to limited number of receptors on the membrane. In some embodiments, potential personalized therapy may be developed by screening for cytotoxic drugs that have low resistance problems and are most effective at killing tumor cells without having to consider selectivity, and then providing selectivity to melanoma cells through the drug-MT-II conjugate design. In other embodiments, a potential combinational therapy with MT-II conjugated to different cytotoxic drugs can be developed based on the drug-MT-II conjugate design, as combinational therapy is widely considered as the best option for drug resistance cancer. These approaches can greatly reduce the chances of the melanoma tumor becoming resistant to the therapy.

Treatments of Skin Cancer

Case 1: A patient suffering from basal cell carcinoma.

A 55-yr old Caucasian male patient is diagnosed with basal cell carcinoma. His dermatologist prescribes a treatment: topical apply a gel once per day to the tumor, said gel containing 50 mg/g of an MC1R peptide ligand of the present invention. After 6 months, the tumor is gone and his dermatologist determines that the patient is cured. One year later and there is no reoccurrence of basal cell carcinoma.

Case 2: A patient suffering from squamous cell carcinoma.

A 50-yr old Caucasian male patient is diagnosed with squamous cell carcinoma. His dermatologist prescribes a treatment: weekly intravenous administration of 50 ml solution containing 200 mg of CPT-SHU9119. After 3 months, the tumor is gone and his dermatologist determines that the patient is cured. One year later and there is still no reoccurrence of squamous cell carcinoma.

Case 3: A patient suffering from melanoma.

A 62-yr old Caucasian female patient is diagnosed with stage II melanoma. Her dermatologist prescribes a treatment: surgery to remove the tumor and take one tablet containing 100 mg of CPT-MT-II daily for 6 months. After 6 months, the patient is in remission. One year later and there is still no reoccurrence of melanoma.

Exemplified embodiments of the present invention are provided below. It is to be understood that the present invention is not limited to said embodiments.

Embodiment 1: A pharmaceutical composition comprising a ligand-drug conjugate comprising a peptide ligand bound to a drug moiety, wherein the ligand-drug conjugate is according to the formula: L-A-B-D, wherein L is the peptide ligand, A is a spacer, B is a cleavable linker, and D is the drug moiety, wherein the peptide ligand is selective for a melanocortin 1 receptor (MC1R), wherein the peptide ligand is according to the formula: Ac-Nle-c[Asp-His-Taa-Arg-Trp-Lys]-NH$_2$ (SEQ ID NO: 89), or is a derivative that has at least 50% homology to SEQ ID NO: 89, wherein Taa is DPhe or DNal(2').

Embodiment 2: The composition of Embodiment 1, wherein the derivative has at least 60% homology, at least 70% homology, at least 80% homology, or at least 90% homology to SEQ ID NO: 89.

Embodiment 3: The composition of Embodiment 1, wherein the peptide ligand has at least one backbone residue that is N-methylated.

Embodiment 4: The composition of Embodiment 1, wherein the peptide ligand is one of the following:
Ac-Nle-c[Asp-His-DPhe-Arg-Trp-Lys]-NH$_2$ (SEQ ID NO: 4);
Ac-Nle-c[Asp-His-DNal(2')-Arg-Trp-Lys]-NH$_2$ (SEQ ID NO: 5); or a derivative that has at least 50% homology to SEQ ID NO: 4 or SEQ ID NO: 5.

Embodiment 5: The composition of Embodiment 4, wherein the derivative has at least 60% homology, at least 70% homology, at least 80% homology, or at least 90% homology to SEQ ID NO: 4, or SEQ ID NO: 5.

Embodiment 6: The composition of Embodiment 4, wherein the peptide ligand has at least one backbone residue that is N-methylated.

Embodiment 7: The composition of Embodiment 4, wherein the peptide ligand is any one of SEQ ID NOs. 7-68.

Embodiment 8: The composition of Embodiment 1, wherein the spacer is derived from aminohexanoic acid and cysteine.

Embodiment 9: The composition of Embodiment 1, wherein the cleavable linker is a biodegradable linker.

Embodiment 10: The composition of Embodiment 1, wherein the cleavable linker comprises 1,2,3-triazole, an imine, a disulfide, a thioether, a primary amide, or a secondary amide.

Embodiment 11: The composition of Embodiment 1, wherein the drug moiety is a cancer drug.

Embodiment 12: The composition of Embodiment 1, wherein the drug moiety is a topoisomerase I inhibitor.

Embodiment 13: The composition of Embodiment 1, wherein the drug moiety is camptothecin.

Embodiment 14: The composition of Embodiment 1, wherein the drug moiety is a BRAF, MEK, PD-1, PD-L1, or CTLA-4 inhibitor.

Embodiment 15: The composition of Embodiment 1, wherein the drug moiety is Atezolizumab, Avelumab, Aldesleukin, Binimetinib, Braftovi, Carboplatin, Cemiplimab-rwlc, Cisplatin, Cobimetinib, Dabrafenib Mesylate, Dacarbazine, Diclofenac, Durvalumab, Encorafenib, 5-Fluorouracil, hyaluronic acid, Imiquimod, Imlygic, Ingenol mebutate, Interleukin-2, Ipilimumab, Nivolumab, Paclitaxel, Peginterferon Alfa-2b, Pembrolizumab, Recombinant Interferon Alfa-2b, Sonidegib, Talimogene Laherparepvec, Temozolomide, Trametinib, Vemurafenib, Vinblastine, Vismodegib, or combinations thereof.

Embodiment 16: The composition of Embodiment 4, wherein the ligand-drug conjugate is according to the following:

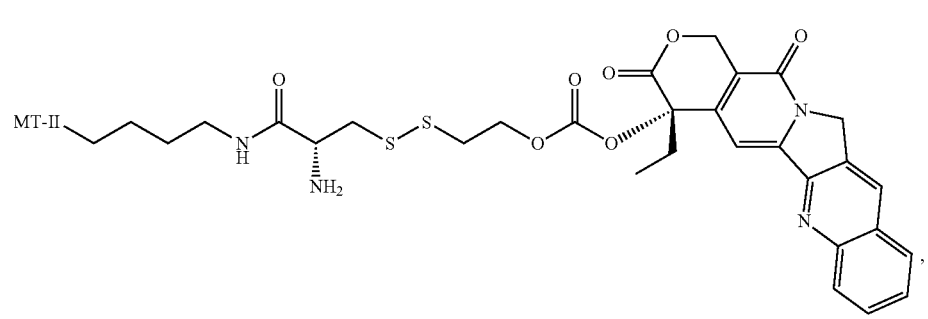

wherein MT-II is SEQ ID NO: 4.

Embodiment 17: A method of treating skin cancer in a subject in need of such treatment, the method comprising administering to the subject a therapeutically effective amount of a pharmaceutical composition according to Embodiment 1.

Embodiment 18: A method of increasing selectivity of a drug for a target receptor, comprising attaching a spacer to a peptide ligand that is selective for a melanocortin 1 receptor (MC1R); attaching a cleavable linker to a drug moiety; and attaching the cleavable linker to the spacer, thereby linking the peptide ligand to the drug moiety to form a ligand-drug conjugate that is selective for MC1R. The peptide ligand is selective for a melanocortin 1 receptor (MC1R), wherein the peptide ligand is according to the formula: Ac-Nle-c[Asp-His-Taa-Arg-Trp-Lys]-NH$_2$ (SEQ ID NO: 89), or is a derivative that has at least 50% homology to SEQ ID NO: 89, wherein Taa is DPhe or DNal(2').

Embodiment 19: The method of Embodiment 18, wherein the drug moiety is a cancer drug.

Embodiment 20: The method of Embodiment 18, wherein the peptide ligand has at least one backbone residue that is N-methylated.

Embodiment 21: The method of Embodiment 18, wherein the peptide ligand is one of SEQ ID NO. 7-68.

Embodiment 22: A pharmaceutical composition comprising a ligand-drug conjugate comprising a peptide ligand bound to a drug moiety, wherein the ligand-drug conjugate is according to the formula: L-A-B-D, wherein L is the peptide ligand, A is a spacer, B is a cleavable linker, and D is the drug moiety, wherein the peptide ligand is selective for a melanocortin 1 receptor (MC1R), wherein the peptide ligand is one of the following: i) Ac-Nle-c[Asp-His-DPhe-Arg-Trp-Lys]-NH$_2$ (SEQ ID NO: 4); ii) Ac-Nle-c[Asp-His-DNal(2')-Arg-Trp-Lys]-NH$_2$ (SEQ ID NO: 5); iii) according to the formula: H-Tyr$^1$-Val$^2$-Waa$^3$-Gly$^4$-Xaa$^5$-Paa$^6$-Yaa$^7$-Zaa$^8$-Asp$^9$-Arg$^{10}$-Phe$^{11}$-Gly$^{12}$-R1 (SEQ ID NO:6), wherein Waa is a Met, Ile, Leu, or Nle; Xaa is a His or Pro; Paa is Phe or DPhe; Yaa is an Arg or Leu; and Zaa is a Dnal(2'), Phe or Trp, with the caveat that Waa is not Met, Xaa is not His, Yaa is not Arg, and Zaa is not Trp simultaneously; or iv) a derivative that has at least 50% homology to SEQ ID NO: 4, SEQ ID NO: 5, or SEQ ID NO: 6.

Embodiment 23: The composition of Embodiment 22, wherein the derivative has at least 60% homology, at least 70% homology, at least 80% homology, or at least 90% homology to SEQ ID NO: 4, SEQ ID NO: 5, or SEQ ID NO: 6.

Embodiment 24: The composition of Embodiment 22, wherein the peptide ligand is one of SEQ ID NO: 7-68 or 77-88:

Embodiment 25: The composition of Embodiment 22, wherein the spacer is derived from aminohexanoic acid and cysteine.

Embodiment 26: The composition of Embodiment 22, wherein the cleavable linker is a biodegradable linker.

Embodiment 27: The composition of Embodiment 22, wherein the cleavable linker comprises 1,2,3-triazole, an imine, a disulfide, a thioether, a primary amide, or a secondary amide.

Embodiment 28: The composition of Embodiment 22, wherein the drug moiety is a cancer drug.

Embodiment 29: The composition of Embodiment 22, wherein the drug moiety is a topoisomerase I inhibitor.

Embodiment 30: The composition of Embodiment 22, wherein the drug moiety is camptothecin.

Embodiment 31: The composition of Embodiment 22, wherein the drug moiety is a BRAF, MEK, PD-1, PD-L1, or CTLA-4 inhibitor.

Embodiment 32: The composition of Embodiment 22, wherein the drug moiety is Atezolizumab, Avelumab, Aldesleukin, Binimetinib, Braftovi, Carboplatin, Cemiplimab-rwlc, Cisplatin, Cobimetinib, Dabrafenib Mesylate, Dacarbazine, Diclofenac, Durvalumab, Encorafenib, 5-Fluorouracil, hyaluronic acid, Imiquimod, Imlygic, Ingenol mebutate, Interleukin-2, Ipilimumab, Nivolumab, Paclitaxel, Peginterferon Alfa-2b, Pembrolizumab, Recombinant Interferon Alfa-2b, Sonidegib, Talimogene Laherparepvec, Temozolomide, Trametinib, Vemurafenib, Vinblastine, Vismodegib, or combinations thereof.

Embodiment 33: The composition of Embodiment 22, wherein the ligand-drug conjugate is according to the following:

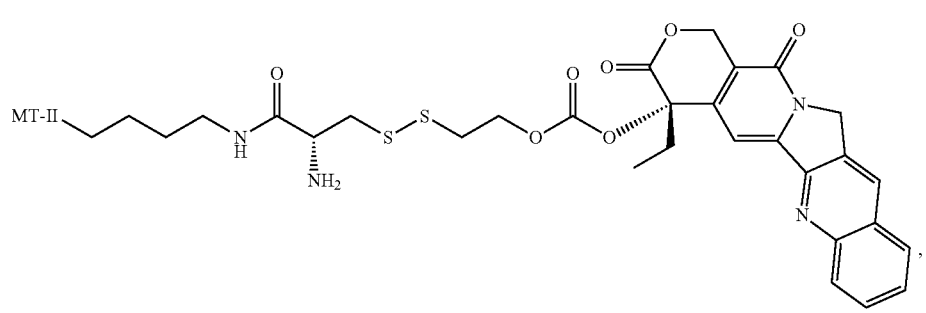

wherein MT-II is SEQ ID NO: 4.

Embodiment 34: The composition of Embodiment 22, wherein the ligand-drug conjugate is effective for killing a melanoma cell, wherein the ligand-drug conjugate binds to a melanocortin 1 receptor of the melanoma cell via the peptide ligand, wherein the drug moiety targets pathways essential for cell proliferation or survival.

Embodiment 35: A method of treating skin cancer in a subject in need of such treatment, the method comprising administering to the subject a therapeutically effective amount of a pharmaceutical composition according to Embodiment 22.

Embodiment 36: The method of Embodiment 35, wherein the pharmaceutical composition is administered at a dose ranging from about 0.001 mg/kg to 100 mg/kg of body weight.

Embodiment 37: A method of increasing selectivity of a drug for a target receptor, comprising attaching a spacer to a peptide ligand that is selective for a melanocortin 1 receptor (MC1R), attaching a cleavable linker to a drug moiety, and attaching the cleavable linker to the spacer, thereby linking the peptide ligand to the drug moiety to form a ligand-drug conjugate that is that is selective for MC1R, wherein the peptide ligand is selective for a melanocortin 1 receptor (MC1R), wherein the peptide ligand is one of the following: i) Ac-Nle-c[Asp-His-DPhe-Arg-Trp-Lys]-NH$_2$ (SEQ ID NO: 4); ii) Ac-Nle-c[Asp-His-DNal(2')-Arg-Trp-Lys]-NH$_2$ (SEQ ID NO: 5); iii) according to the formula: H-Tyr$^1$-Val$^2$-Waa$^3$-Gly$^4$-Xaa$^5$-Paa$^6$-Yaa$^7$-Zaa$^8$-Asp$^9$-Arg$^{10}$-Phe$^{11}$-Gly$^{12}$-R1 (SEQ ID NO:6), wherein Waa is a Met, Ile, Leu, or Nle; Xaa is a His or Pro; Paa is Phe or DPhe; Yaa is an Arg or Leu; and Zaa is a Dnal(2'), Phe or Trp, with the caveat that Waa is not Met, Xaa is not His, Yaa is not Arg, and Zaa is not Trp simultaneously; or iv) a derivative that has at least 50% homology to SEQ ID NO: 4, SEQ ID NO: 5, or SEQ ID NO: 6.

Embodiment 38: The method of Embodiment 37, wherein the cleavable linker is a biodegradable linker.

Embodiment 39: The method of Embodiment 37, wherein the drug moiety is a cancer drug.

Embodiment 40: The method of Embodiment 37, wherein the peptide ligand is one of SEQ ID NO. 7-68 or 77-88.

Embodiment 41: The method of Embodiment 37, wherein the ligand-drug conjugate is according to the following:

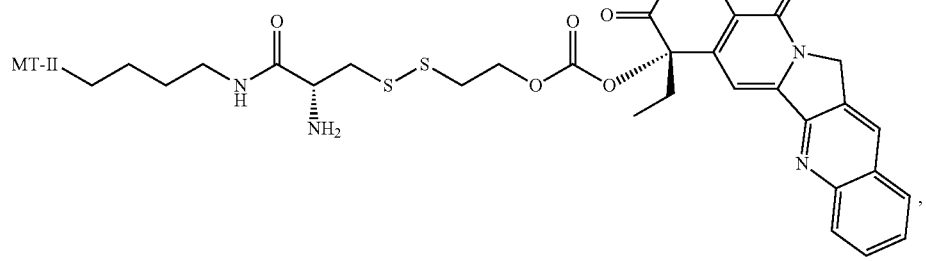

wherein MT-II is Ac-Nle-c[Asp-His-DPhe-Arg-Trp-Lys]-NH$_2$ (SEQ ID NO: 4).

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. The figures are representative only and the claims are not limited by the dimensions of the figures. In some embodiments, descriptions of the inventions using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A pharmaceutical composition comprising a ligand-drug conjugate comprising a peptide ligand bound to a drug moiety, wherein the ligand-drug conjugate is according to the formula: L-A-B-D, wherein L is the peptide ligand, A is a spacer derived from aminohexanoic acid, B is a cleavable linker, and D is the drug moiety, wherein the peptide ligand is according to the formula:

Ac-Nle-c[Asp-His-Taa-Arg-Trp-Lys]-NH$_2$ (SEQ ID NO: 89), or is a derivative that has at least 50% homology to SEQ ID NO: 89, wherein Taa is DPhe or DNal(2').

2. The composition of claim 1, wherein the derivative has at least 60% homology, at least 70% homology, at least 80% homology, or at least 90% homology to SEQ ID NO: 89.

3. The composition of claim 1, wherein the peptide ligand has at least one backbone residue that is N-methylated.

4. The composition of claim 1, wherein the peptide ligand is one of the following:

Ac-Nle-c[Asp-His-DPhe-Arg-Trp-Lys]-NH$_2$ (SEQ ID NO: 4);

Ac-Nle-c[Asp-His-DNal(2)-Arg-Trp-Lys]-NH$_2$ (SEQ ID NO: 5); or a derivative that has at least 50% homology to SEQ ID NO: 4 or SEQ ID NO: 5.

5. The composition of claim 4, wherein the derivative has at least 60% homology, at least 70% homology, at least 80% homology, or at least 90% homology to SEQ ID NO: 4, or SEQ ID NO: 5.

6. The composition of claim 4, wherein the peptide ligand has at least one backbone residue that is N-methylated.

7. The composition of claim 1, wherein the peptide ligand is one of the following:

```
                                         (SEQ ID NO: 7)
Ac-Nle-c[Asp-His-DPhe-Arg-Trp-(NMe)Lys]-NH2

(SEQ ID NO: 8)
Ac-Nle-c[Asp-His-DPhe-Arg-(NMe)Trp-Lys]-NH2

(SEQ ID NO: 9)
Ac-Nle-c[Asp-His-DPhe-(NMe)Arg-Trp-Lys]-NH2

(SEQ ID NO: 10)
Ac-Nle-c[Asp-His-(NMe)DPhe-Arg-Trp-Lys]-NH2

(SEQ ID NO: 11)
Ac-Nle-c[Asp-(NMe)His-DPhe-Arg-Trp-Lys]-NH2

(SEQ ID NO: 12)
Ac-Nle-c[Asp-His-DPhe-Arg-(NMe)Trp-(NMe)Lys]-NH2

(SEQ ID NO: 13)
Ac-Nle-c[Asp-His-DPhe-(NMe)Arg-Trp-(NMe)Lys]-NH2

(SEQ ID NO: 14)
Ac-Nle-c[Asp-His-(NMe)DPhe-Arg-Trp-(NMe)Lys]-NH2

(SEQ ID NO: 15)
Ac-Nle-c[Asp-(NMe)His-DPhe-Arg-Trp-(NMe)Lys]-NH2

(SEQ ID NO: 16)
Ac-Nle-c[Asp-His-DPhe-(NMe)Arg-(NMe)Trp-Lys]-NH2

(SEQ ID NO: 17)
Ac-Nle-c[Asp-His-(NMe)DPhe-Arg-(NMe)Trp-Lys]-NH2

(SEQ ID NO: 18)
Ac-Nle-c[Asp-(NMe)His-DPhe-Arg-(NMe)Trp-Lys]-NH2

(SEQ ID NO: 19)
Ac-Nle-c[Asp-His-(NMe)DPhe-(NMe)Arg-Trp-Lys]-NH2

(SEQ ID NO: 20)
Ac-Nle-c[Asp-(NMe)His-DPhe-(NMe)Arg-Trp-Lys]-NH2

(SEQ ID NO: 21)
Ac-Nle-c[Asp-(NMe)His-(NMe)DPhe-Arg-Trp-Lys]-NH2

(SEQ ID NO: 22)
Ac-Nle-c[Asp-His-DPhe-(NMe)Arg-(NMe)Trp-(NMe)Lys]-NH2

(SEQ ID NO: 23)
Ac-Nle-c[Asp-His-(NMe)DPhe-Arg-(NMe)Trp-(NMe)Lys]-NH2

(SEQ ID NO: 24)
Ac-Nle-c[Asp-(NMe)His-DPhe-Arg-(NMe)Trp-(NMe)Lys]-NH2

(SEQ ID NO: 25)
Ac-Nle-c[Asp-His-(NMe)DPhe-(NMe)Arg-Trp-(NMe)Lys]-NH2

(SEQ ID NO: 26)
Ac-Nle-c[Asp-(NMe)His-DPhe-(NMe)Arg-Trp-(NMe)Lys]-NH2

(SEQ ID NO: 27)
Ac-Nle-c[Asp-(NMe)His-(NMe)DPhe-Arg-Trp-(NMe)Lys]-NH2

(SEQ ID NO: 28)
Ac-Nle-c[Asp-His-(NMe)DPhe-(NMe)Arg-(NMe)Trp-Lys]-NH2

(SEQ ID NO: 29)
Ac-Nle-c[Asp-(NMe)His-DPhe-(NMe)Arg-(NMe)Trp-Lys]-NH2

(SEQ ID NO: 30)
Ac-Nle-c[Asp-(NMe)His-(NMe)DPhe-Arg-(NMe)Trp-Lys]-NH2

(SEQ ID NO: 31)
Ac-Nle-c[Asp-(NMe)His-(NMe)DPhe-(NMe)Arg-Trp-Lys]-NH2

(SEQ ID NO: 32)
Ac-Nle-c[Asp-His-(NMe)DPhe-(NMe)Arg-(NMe)Trp-(NMe)Lys]-NH2

(SEQ ID NO: 33)
Ac-Nle-c[Asp-(NMe)His-DPhe-(NMe)Arg-(NMe)Trp-(NMe)Lys]-NH2

(SEQ ID NO: 34)
Ac-Nle-c[Asp-(NMe)His-(NMe)DPhe-Arg-(NMe)Trp-(NMe)Lys]-NH2

(SEQ ID NO: 35)
Ac-Nle-c[Asp-(NMe)His-(NMe)DPhe-(NMe)Arg-Trp-(NMe)Lys]-NH2

(SEQ ID NO: 36)
Ac-Nle-c[Asp-(NMe)His-(NMe)DPhe-(NMe)Arg-(NMe)Trp-Lys]-NH2

(SEQ ID NO: 37)
Ac-Nle-c[Asp-(NMe)His-(NMe)DPhe-(NMe)Arg-(NMe)Trp-(NMe)Lys]-NH2

(SEQ ID NO: 38)
Ac-Nle-c[Asp-His-DNal(2')-Arg-Trp-(NMe)Lys]-NH2

(SEQ ID NO: 39)
Ac-Nle-c[Asp-His-DNal(2')-Arg-(NMe)Trp-Lys]-NH2

(SEQ ID NO: 40)
Ac-Nle-c[Asp-His-DNal(2')-(NMe)Arg-Trp-Lys]-NH2

(SEQ ID NO: 41)
Ac-Nle-c[Asp-His-(NMe)DNal(2')-Arg-Trp-Lys]-NH2

(SEQ ID NO: 42)
Ac-Nle-c[Asp-(NMe)His-DNal(2')-Arg-Trp-Lys]-NH2

(SEQ ID NO: 43)
Ac-Nle-c[Asp-His-DNal(2')-Arg-(NMe)Trp-(NMe)Lys]-NH2

(SEQ ID NO: 44)
Ac-Nle-c[Asp-His-DNal(2')-(NMe)Arg-Trp-(NMe)Lys]-NH2
```

```
Ac-Nle-c[Asp-His-(NMe)DNal(2')-Arg-Trp-(NMe)Lys]-
NH₂                                        (SEQ ID NO: 45)

Ac-Nle-c[Asp-(NMe)His-DNal(2')-Arg-Trp-(NMe)Lys]-
NH₂                                        (SEQ ID NO: 46)

Ac-Nle-c[Asp-His-DNal(2')-(NMe)Arg-(NMe)Trp-Lys]-
NH₂                                        (SEQ ID NO: 47)

Ac-Nle-c[Asp-His-(NMe)DNal(2')-Arg-(NMe)Trp-Lys]-
NH₂                                        (SEQ ID NO: 48)

Ac-Nle-c[Asp-(NMe)His-DNal(2')-Arg-(NMe)Trp-Lys]-
NH₂                                        (SEQ ID NO: 49)

Ac-Nle-c[Asp-His-(NMe)DNal(2')-(NMe)Arg-Trp-Lys]-
NH₂                                        (SEQ ID NO: 50)

Ac-Nle-c[Asp-(NMe)His-DNal(2')-(NMe)Arg-Trp-Lys]-
NH₂                                        (SEQ ID NO: 51)

Ac-Nle-c[Asp-(NMe)His-(NMe)DNal(2')-Arg-Trp-Lys]-
NH₂                                        (SEQ ID NO: 52)

Ac-Nle-c[Asp-His-DNal(2')-(NMe)Arg-(NMe)Trp-
(NMe)Lys]-NH₂                              (SEQ ID NO: 53)

Ac-Nle-c[Asp-His-(NMe)DNal(2')-Arg-(NMe)Trp-
(NMe)Lys]-NH₂                              (SEQ ID NO: 54)

Ac-Nle-c[Asp-(NMe)His-DNal(2')-Arg-(NMe)Trp-
(NMe)Lys]-NH₂                              (SEQ ID NO: 55)

Ac-Nle-c[Asp-His-(NMe)DNal(2')-(NMe)Arg-Trp-
(NMe)Lys]-NH₂                              (SEQ ID NO: 56)

Ac-Nle-c[Asp-(NMe)His-DNal(2')-(NMe)Arg-Trp-
(NMe)Lys]-NH₂                              (SEQ ID NO: 57)

Ac-Nle-c[Asp-(NMe)His-(NMe)DNal(2')-Arg-Trp-
(NMe)Lys]-NH₂                              (SEQ ID NO: 58)

Ac-Nle-c[Asp-His-(NMe)DNal(2')-(NMe)Arg-(NMe)Trp-
Lys]-NH₂                                   (SEQ ID NO: 59)

Ac-Nle-c[Asp-(NMe)His-DNal(2')-(NMe)Arg-(NMe)Trp-
Lys]-NH₂                                   (SEQ ID NO: 60)

Ac-Nle-c[Asp-(NMe)His-(NMe)DNal(2')-Arg-(NMe)Trp-
Lys]-NH₂                                   (SEQ ID NO: 61)

Ac-Nle-c[Asp-(NMe)His-(NMe)DNal(2')-(NMe)Arg-Trp-
Lys]-NH₂                                   (SEQ ID NO: 62)

Ac-Nle-c[Asp-His-(NMe)DNal(2')-(NMe)Arg-(NMe)Trp-
(NMe)Lys]-NH₂                              (SEQ ID NO: 63)

Ac-Nle-c[Asp-(NMe)His-DNal(2')-(NMe)Arg-(NMe)Trp-
(NMe)Lys]-NH₂                              (SEQ ID NO: 64)

Ac-Nle-c[Asp-(NMe)His-(NMe)DNal(2')-Arg-(NMe)Trp-
(NMe)Lys]-NH₂                              (SEQ ID NO: 65)

Ac-Nle-c[Asp-(NMe)His-(NMe)DNal(2')-(NMe)Arg-Trp-
(NMe)Lys]-NH₂                              (SEQ ID NO: 66)

Ac-Nle-c[Asp-(NMe)His-(NMe)DNal(2')-(NMe)Arg-
(NMe)Trp-Lys]-NH₂                          (SEQ ID NO: 67)

Ac-Nle-c[Asp-(NMe)His-(NMe)DNal(2')-(NMe)Arg-
(NMe)Trp-(NMe)Lys]-NH₂.                    (SEQ ID NO: 68)
```

8. The composition of claim 1, wherein the cleavable linker is a biodegradable linker.

9. The composition of claim 1, wherein the cleavable linker comprises 1,2,3-triazole, an imine, a disulfide, a thioether, a primary amide, or a secondary amide.

10. The composition of claim 1, wherein the drug moiety is a cancer drug.

11. The composition of claim 1, wherein the drug moiety is a topoisomerase I inhibitor.

12. The composition of claim 1, wherein the drug moiety is camptothecin.

13. The composition of claim 1, wherein the drug moiety is a BRAF, MEK, PD-1, PD-L1, or CTLA-4 inhibitor.

14. The composition of claim 1, wherein the drug moiety is Atezolizumab, Avelumab, Aldesleukin, Binimetinib, Braftovi, Carboplatin, Cemiplimab-rwlc, Cisplatin, Cobimetinib, Dabrafenib Mesylate, Dacarbazine, Diclofenac, Durvalumab, Encorafenib, 5-Fluorouracil, hyaluronic acid, Imiquimod, Imlygic, Ingenol mebutate, Interleukin-2, Ipilimumab, Nivolumab, Paclitaxel, Peginterferon Alfa-2b, Pembrolizumab, Recombinant Interferon Alfa-2b, Sonidegib, Talimogene Laherparepvec, Temozolomide, Trametinib, Vemurafenib, Vinblastine, Vismodegib, or combinations thereof.

15. A pharmaceutical composition comprising a ligand-drug conjugate, wherein the ligand-drug conjugate is according to the following:

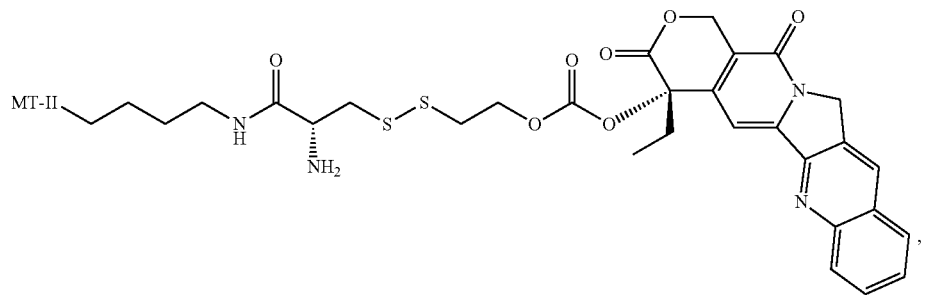

wherein MT-II is Ac-Nle-c[Asp-His-DPhe-Arg-Trp-Lys]-NH₂ (SEQ ID NO: 4).

16. A pharmaceutical composition comprising a ligand-drug conjugate comprising a peptide ligand bound to a drug moiety, wherein the ligand-drug conjugate is according to the formula: L-A-B-D, wherein L is the peptide ligand, A is a spacer, B is a cleavable linker, and D is the drug moiety, wherein the peptide ligand is according to the formula:

Ac-Nle-c[Asp-His-Taa-Arg-Trp-Lys]-NH₂ (SEQ ID NO: 89), or is a derivative that has at least 50% homology to SEQ ID NO: 89, wherein Taa is DPhe or DNal(2'), wherein the peptide ligand has at least one backbone residue that is N-methylated.

* * * * *